United States Patent [19]
McCarthy

[11] Patent Number: 5,367,410
[45] Date of Patent: Nov. 22, 1994

[54] STORAGE OF DATA ON TAPE IN MULTI-TRACK FRAMES OF INTERLEAVED DATA, WITH DATA TRANSFER ON INDIVIDUAL TRACK BASIS

[75] Inventor: Dominic McCarthy, Rangeworthy, England

[73] Assignee: Hewlett-Packard Company, Palo Alto, Calif.

[21] Appl. No.: 24,527

[22] Filed: Mar. 1, 1993

[30] Foreign Application Priority Data

Mar. 10, 1992 [EP] European Pat. Off. ........ 92302015.0

[51] Int. Cl.$^5$ ........................... G11B 5/09; G11B 5/02
[52] U.S. Cl. ......................................... 360/48; 360/22
[58] Field of Search ................... 360/48, 22, 32, 46, 360/64, 50, 49, 53; 341/109; 371/38; 380/37

[56] References Cited

U.S. PATENT DOCUMENTS

| | | | |
|---|---|---|---|
| 4,078,152 | 3/1978 | Tuckerman | 380/37 |
| 4,562,577 | 12/1985 | Glover et al. | 371/38 |
| 4,584,616 | 4/1986 | Allen | 360/50 X |
| 4,672,613 | 6/1987 | Foxworthy et al. | 371/38 |
| 4,758,902 | 7/1988 | Okamoto et al. | 360/32 X |
| 4,899,232 | 2/1990 | Odaka et al. | 360/48 |
| 4,978,955 | 12/1990 | Howell | 341/109 |
| 5,122,913 | 6/1992 | Yamamoto | 360/53 |

FOREIGN PATENT DOCUMENTS

0386362A3 9/1990 European Pat. Off. .
0437779A2 7/1991 European Pat. Off. .
WO91/14266 9/1991 United Kingdom .

OTHER PUBLICATIONS

Navy Technical Disclosure Bulletin vol. 9, No. 4, Jun. 1984 Washington, U.S. pp. 31–35 S. Stello et al "A Four Track Parallel Cartridge Formatter".

*Primary Examiner*—Donald Hajec
*Assistant Examiner*—Patrick Wamsley

[57] ABSTRACT

Data storage apparatus stores and retrieves data on tape, using a helical scanning write/read technique with data being stored in tracks of predetermined format written across the tape, for example in accordance with the DAT format. The apparatus comprises a data organizer for organizing data to be stored into frame units, each corresponding to two tracks' worth of data, and for disassembling data out of the frame units upon data retrieval; and a formatter for processing data received from the data organizer into the track format for writing to tape during data storage, and for reversing this process during data retrieval. Constituent data elements from each frame unit are interleaved with each other across two tracks when written to tape. To minimize the processing propagation delay and memory requirements of the formatter, transfer of data between the data organizer and the formatter is effected on a track-by-track basis, rather than on the basis of frame units, with the transfer of data in respect of one track being completed before transfer of data in respect of the next track is commenced.

20 Claims, 12 Drawing Sheets

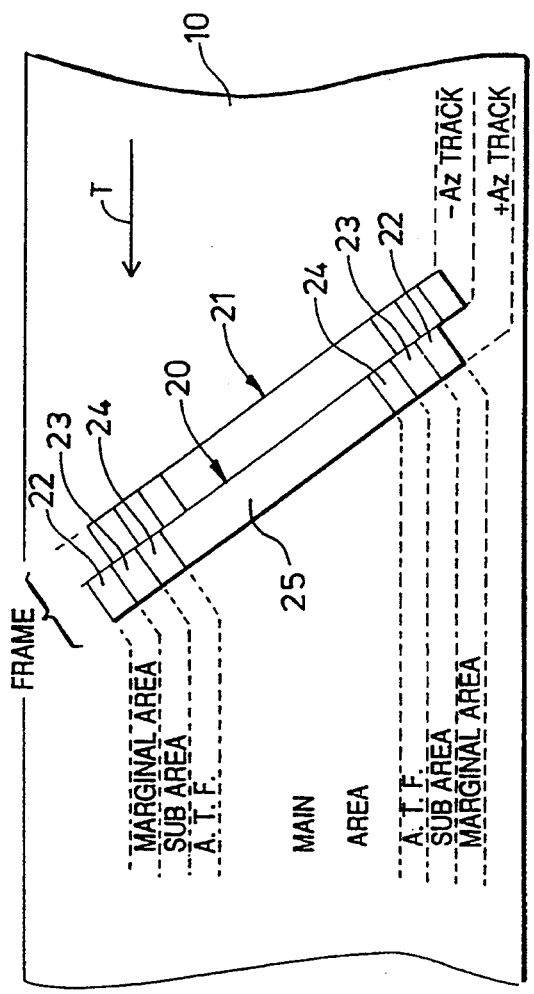
FIG. 1 (PRIOR ART)
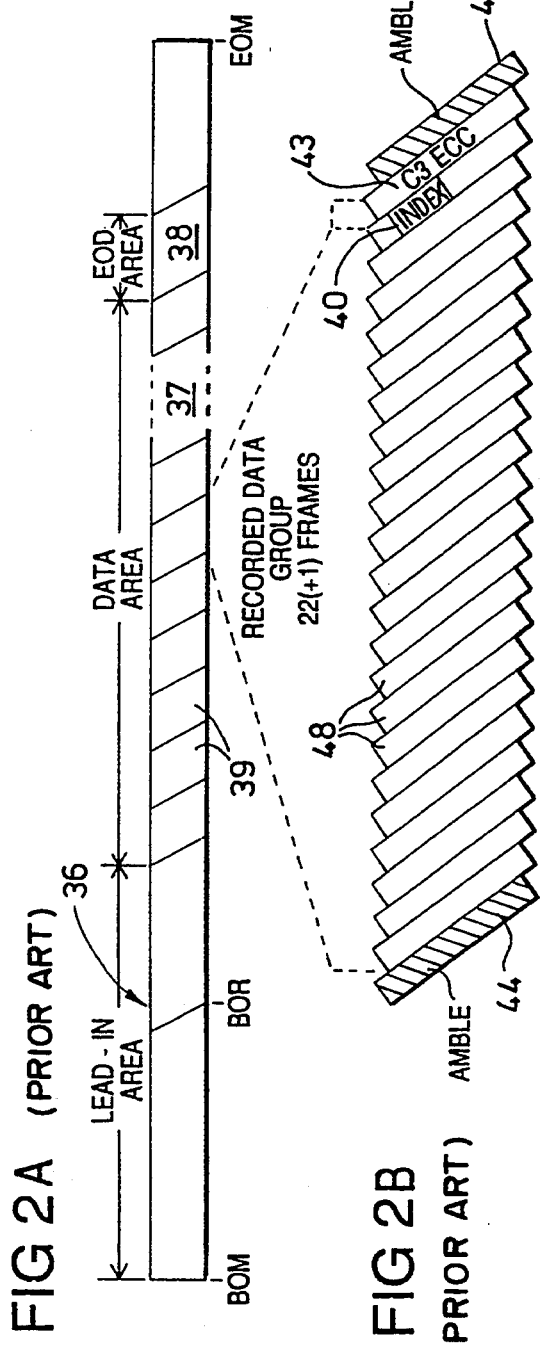
FIG. 2A (PRIOR ART)
FIG. 2B (PRIOR ART)

BASIC GROUP

G1 SUB - GROUPS

G2 SUB - GROUPS

FIG 7
(PRIOR ART)

| WORD NUMBER | CHANNEL A | | CHANNEL B | |
|---|---|---|---|---|
| | LOWER BYTE | UPPER BYTE | LOWER BYTE | UPPER BYTE |
| | 1 2 3 4 5 6 7 8 | 1 2 3 4 5 6 7 8 | 1 2 3 4 5 6 7 8 | 1 2 3 4 5 6 7 8 |
| HEADER → 0 | DF-ID 0 0 0 0 | LF - ID | DF-ID 0 0 0 0 | LF - ID |
| 1 | D0 | D1 | D2 | D3 |
| 2 | D4 | D5 | D6 | D7 |
| 3 | D8 | D9 | D10 | D11 |
| ⋮ | ⋮ | ⋮ | ⋮ | ⋮ |
| 1438 | D5748 | D5749 | D5750 | D5751 |
| 1439 | D5752 | D5753 | D5754 | D5755 |
| 1440 ⋮ 1455 | ALL BYTES SET TO ALL ZEROs | | | |

G3 SUB - GROUP

FIG 8
(PRIOR ART)

TWIN ARRAYS FOR G4 SUB - GROUP

COLUMN NO. →
BYTE SERIAL NO. ↓

MAIN DATA BLOCK

SUB DATA BLOCK

| ZONE | CONTENTS | NUMBER OF BLOCKS |
|---|---|---|
| MARGIN ZONE 1 | MARGIN BLOCKS | 11 |
| SUB ZONE 1 | PREAMBLE BLOCKS<br>REC. SUB DATA BLOCKS<br>POSTAMBLE BLOCKS | 2<br>8<br>1 |
| ATF ZONE 1 | SPACER BLOCKS<br>ATF BLOCKS<br>SPACER BLOCKS | 3<br>5<br>3 |
| MAIN ZONE | PREAMBLE BLOCKS<br>REC. MAIN DATA BLOCKS | 2<br>128 |
| ATF ZONE 2 | SPACER BLOCKS<br>ATF BLOCKS<br>SPACER BLOCKS | 3<br>5<br>3 |
| SUB ZONE 2 | PREAMBLE BLOCKS<br>REC. SUB DATA BLOCKS<br>POSTAMBLE BLOCKS | 2<br>8<br>1 |
| MARGIN ZONE 2 | MARGIN BLOCKS | 11 |

SEQUENCE OF RECORDING ↓   Total: 196

FORMAT OF A TRACK

FIG 11   (PRIOR ART)

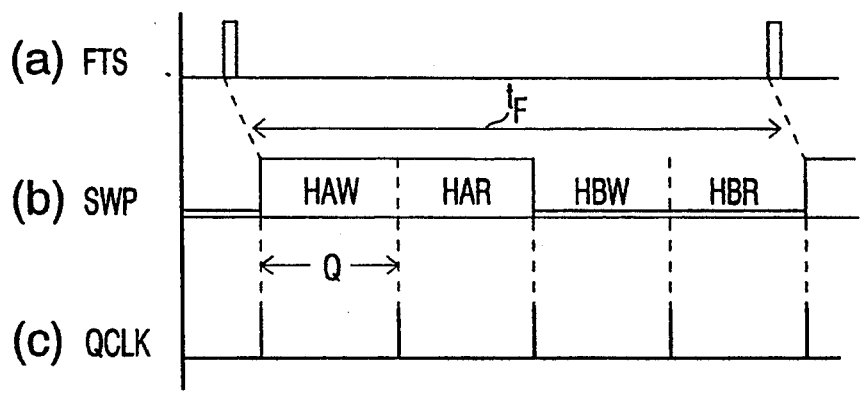

FIG 14

| $D_{0,0}$ | $D_{0,2}$ | $D_{0,4}$ | $D_{0,6}$ | $D_{0,8}$ | $D_{0,10}$ | $D_{0,12}$ | $D_{0,14}$ | $D_{0,16}$ | $D_{0,18}$ | $D_{0,20}$ | $D_{0,22}$ | $D_{0,24}$ | $D_{0,26}$ | $D_{0,28}$ | $D_{0,30}$ |
| --- | --- | --- | --- | --- | --- | --- | --- | --- | --- | --- | --- | --- | --- | --- | --- |
| $D_{1,0}$ | $D_{1,2}$ | $D_{1,4}$ | $D_{1,6}$ | $D_{1,8}$ | $D_{1,10}$ | $D_{1,12}$ | $D_{1,14}$ | $D_{1,16}$ | $D_{1,18}$ | $D_{1,20}$ | $D_{1,22}$ | $D_{1,24}$ | $D_{1,26}$ | $D_{1,28}$ | $D_{1,30}$ |
| $D_{0,1}$ | $D_{0,3}$ | $D_{0,5}$ | $D_{0,7}$ | $D_{0,9}$ | $D_{0,11}$ | $D_{0,13}$ | $D_{0,15}$ | $D_{0,17}$ | $D_{0,19}$ | $D_{0,21}$ | $D_{0,23}$ | $D_{0,25}$ | $D_{0,27}$ | $D_{0,29}$ | $D_{0,31}$ |
| $D_{1,1}$ | $D_{1,3}$ | $D_{1,5}$ | $D_{1,7}$ | $D_{1,9}$ | $D_{1,11}$ | $D_{1,13}$ | $D_{1,15}$ | $D_{1,17}$ | $D_{1,19}$ | $D_{1,21}$ | $D_{1,23}$ | $D_{1,25}$ | $D_{1,27}$ | $D_{1,29}$ | $D_{1,31}$ |

FIG 13

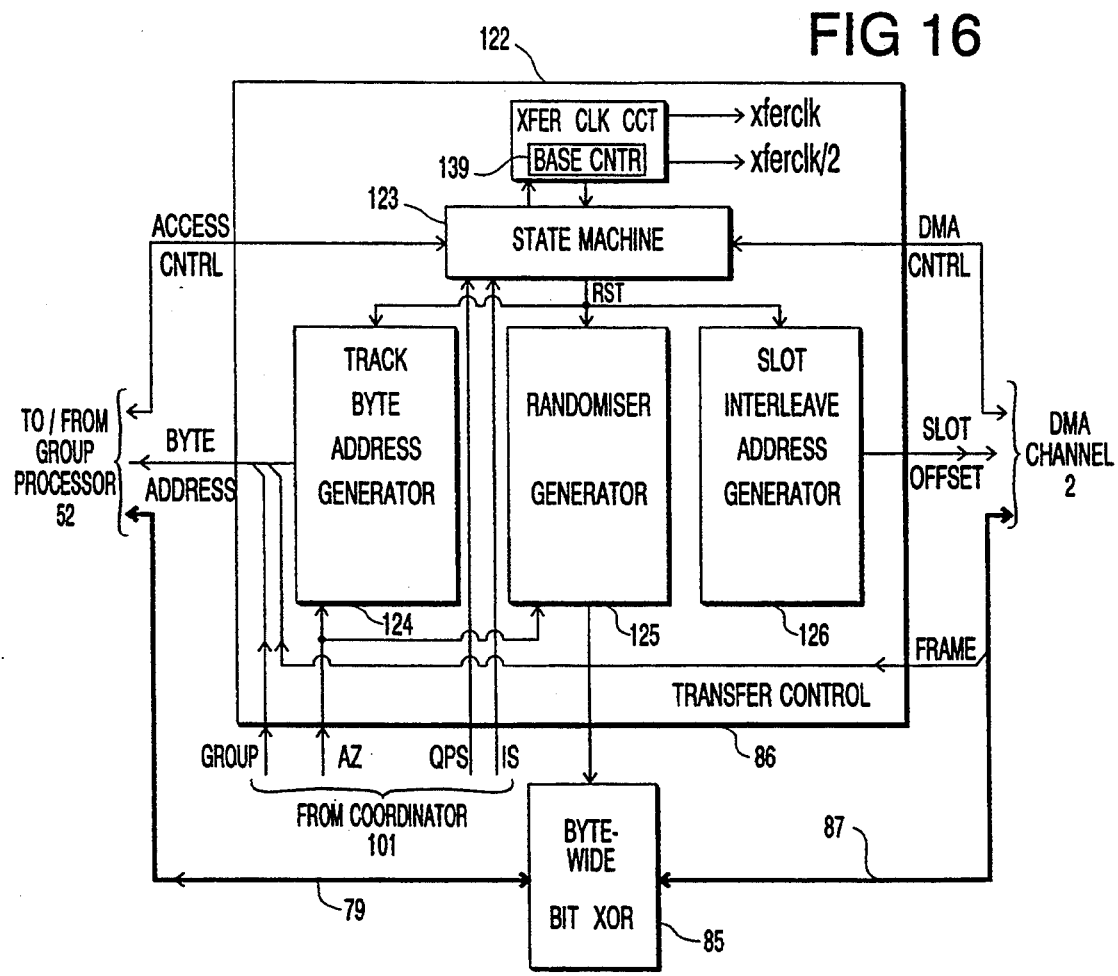

| COUNTER OUTPUT | DEC. EQUIV. | + AZ TRACK BYTE ADDR. | DEC. EQUIV. | - AZ TRACK BYTE ADDR. | DEC. EQUIV. |
|---|---|---|---|---|---|
| .00000 | 0 | .00010 | 2 | .00000 | 0 |
| .00001 | 1 | .00011 | 3 | .00001 | 1 |
| .00010 | 2 | .00100 | 4 | .00110 | 6 |
| .00011 | 3 | .00101 | 5 | .00111 | 7 |
| .00100 | 4 | .01010 | 10 | .01000 | 8 |
| .00101 | 5 | .01011 | 11 | .01001 | 9 |
| .00110 | 6 | .01100 | 12 | .01110 | 14 |
| .00111 | 7 | .01101 | 13 | .01111 | 15 |
| .01000 | 8 | .10010 | 18 | .10000 | 16 |
| .01001 | 9 | .10011 | 19 | .10001 | 17 |
| .01010 | 10 | .10100 | 20 | .10110 | 22 |
| .01011 | 11 | .10101 | 21 | .10111 | 23 |
| .01100 | 12 | .11010 | 26 | .11000 | 24 |
| .01101 | 13 | .11011 | 27 | .11001 | 25 |
| .01110 | 14 | .11100 | 28 | .11110 | 30 |
| .01111 | 15 | .11101 | 29 | .11111 | 31 |

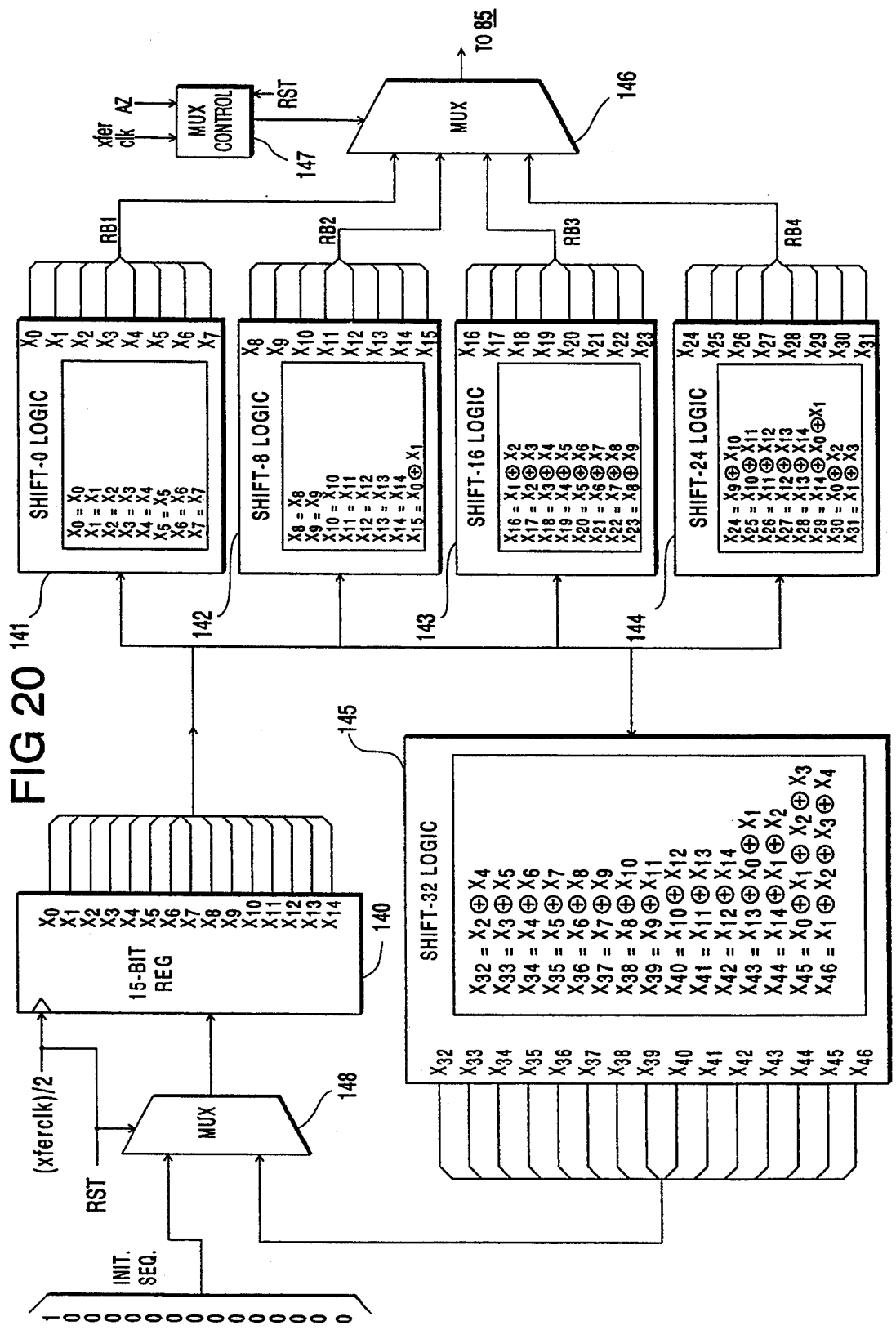

STORAGE OF DATA ON TAPE IN MULTI-TRACK FRAMES OF INTERLEAVED DATA, WITH DATA TRANSFER ON INDIVIDUAL TRACK BASIS

FIELD OF THE INVENTION

The present invention relates to data storage apparatus for storing and retrieving data on tape using a helical scanning write/read technique with data being stored in tracks of predetermined format written across the tape.

BACKGROUND ART

It is well known to store computer data on tape using a helical scan recording technique. Thus, for example, it is known to use DAT (Digital Audio Tape) technology to store computer data in accordance with the DDS (Digital Data Storage) format jointly developed by Hewlett-Packard Limited and Sony Corporation; the DDS format is specified in ISO/IEC Standard 10777:1991 E.

Data storage apparatus using DAT technology generally comprises:
  a tape deck with a rotary head drum mounting heads for writing/reading data to/from tape in tracks of predetermined format;
  data organising means operative (i) during data storage to receive data to be stored and to organise it at least notionally, on the basis of frame units each corresponding to two track's worth of data, and (ii) during data retrieval, to disassemble the data out of frame units for output from said apparatus, said data organising means including a buffer memory for holding said frame units,
  formatting means operative (i) during data storage, to receive data transferred in from the buffer memory and to process it into said track format prior to being written in tracks to tape by said heads, constituent data elements from each frame unit being interleaved with each other across two tracks and (ii) during data retrieval, to receive data read from tape by the heads and to process it out of said track format ready for transfer out to buffer memory, the data in the bullet memory being held therein in non-interleaved form,
  transfer means for transferring data from the buffer memory to the formatting means during data storage and from the formatting means to the buffer memory during data retrieval, and
  a system controller for controlling and coordinating operation of the apparatus.

For data storage apparatus implementing the aforesaid DDS format, during data storage the data organising means organises incoming data into groups of twenty two frame units known as G1 sub-groups, the final frame unit of a group including an index of record and file boundaries for data in the group. (It will be understood that the organisation of data into groups may be effected either by actual physical organisation of data within the buffer memory or by the appropriate setting of pointers delimiting group boundaries. Furthermore, the frame units themselves may not be specifically identified within a group but the group size and the manner of its processing within the data organising means is based upon the concept of a frame unit of data; for this reason, the data organising means can be said to effect organisation of data, at least notionally, on the basis of frame units). Once data has been assembled into a group, the frame units of the group are transferred to the formatting means and in the course of this transfer are randomized and interleaved. The formatting means thereafter carries out a number of functions including generating error correction codes from data, combining the data with the error correction codes and with auxiliary codes, generating track signals therefrom and passing the track signals to the head drum for writing to tape.

During data retrieval, the formatting means receives track signals read from tape and effects error detection/correction during processing of data out of said format. The read-back data is then transferred to the data organising means and in the course of this transfer is de-interleaved and de-randomized. The data organising means thereafter disassembles the data from the twenty-two frame-unit groups and outputs the retrieved data.

European patent specification EP-A2-0,437,779 (Archive Corporation) illustrates in general terms one form of DDS-based data storage device. In this case, there are separate read and write audio DAT formatter blocks each with its own local RAM memory.

Generally with regard to DAT-based storage apparatus, because of the complexity of the processing effected by the formatting means, there is a significant processing delay through the formatting means. As a result, it becomes necessary for data in respect of several tracks to be handled at any one time by the formatting means with the data associated with different tracks being at different stages of processing. Thus, it can be seen from a study of the timing diagrams of FIG. 4 of EP-A2-0,437,779 that the formatting means of the described storage apparatus has a processing propagation delay therethrough for writing/reading of at least ten times the time taken by the head drum to read/write a track. As a consequence of the large processing propagation delay, the formatting means requires a considerable amount of memory to hold all the data currently being processed; thus, for the apparatus shown in EP-A2-0,437,779 a minimum of six track's worth of data must be stored by each of the local RAM memories.

It is an object of the present invention to enable the processing propagation delay through the formatting means to be reduced.

SUMMARY OF THE INVENTION

As already noted above, DAT-based data storage apparatus handle data in frame units and interleave constituent data elements of a frame unit across two tracks. Interleaving is generally effected by passing the constituent data elements of a frame unit to the formatting means in the order of their occurrence in the non-interleaved frame unit, and then storing the data elements in a memory of the formatting means according to a predetermined interleave pattern.

With respect to data storage apparatus implementing the DDS format, another reason to transfer the constituent data elements of a frame unit to the formatting means in the order of their occurrence in the non-interleaved frame unit, is that the randomisation process that is carried out on data being transferred to the formatting means, is effected using a randomising sequence that is progressive across a whole frame unit when taken in non-interleaved order.

A consequence of transferring the constituent data elements of a frame unit to the formatting means in the order of their occurrence in the non-interleaved frame unit, is that the whole frame unit must be transferred to complete the transfer of data relevant to either of the corresponding tracks. This results in an increase both of the processing propagation delay and memory requirement of the formatting means.

According to the present invention, the transfer of data between the data organising means and formatting means is effected on a track-by-track basis with the transfer of data in respect of one track being completed before the transfer of data in respect of the next track is commenced. To achieve this requires increasing the complexity of the transfer means to select the constituent data elements of a frame unit relevant to the track currently being transferred; however, the benefit accruing is a reduction in the processing propagation delay and memory requirement of the formatting means.

More formally stated, according to the present invention, there is provided data storage apparatus for storing and retrieving data on tape using a helical scanning write/read technique with data being stored in tracks of predetermined format written across the tape, said apparatus comprising:

a tape deck with a rotary head drum mounting heads for writing/reading data to/from the tape in tracks, data organising means operative (i) during data storage, to receive data to be stored and to organise it at least notionally, on the basis of frame units each corresponding to two track's worth of data and (ii) during data retrieval, to disassemble the data out of frame units for output from said apparatus, said data organising means including a buffer memory for holding said frame units, formatting means operative (i) during data storage, to receive data transferred in from said buffer memory and to process it into said track format prior to being written in tracks to tape by said heads, constituent data elements from each frame unit being interleaved with each other across two tracks, and (ii) during data retrieval to receive data read from tape by said heads and to process it out of said track format ready for transfer out to said buffer memory, the data in said buffer memory being held therein in non-interleaved form, transfer means for transferring data from said buffer memory to said formatting means during data storage and from said formatting means to said buffer memory during data retrieval, and a system controller for controlling and coordinating the operation of said apparatus;

the transfer means transferring data between said buffer memory and said formatting means on a track by track basis with the transfer of data in respect of one said track being completed before the transfer of data in respect of the next said track is commenced.

Preferably, said formatting means includes track memory means for storing data being processed into/out of said track format by the formatting means, said transfer means being operative (i) during data storage, to access non-interleaved data held in the buffer memory of the data organising means and to transfer that data to said track memory means for storage therein in interleaved form, and (ii) during data retrieval, to access data held in said track memory means in interleaved form and transfer it to said buffer memory for storage therein in non-interleaved form.

Advantageously, said transfer means includes first and second address generators for generating addresses respectively for accessing said buffer memory and said track memory means during the transfer of data relevant to one said track, the first and second address generators being operative such that the constituent data elements relevant to said one track are transferred sequentially by the transfer means in the order of their occurrence in the corresponding frame unit when considered in non-interleaved form.

Preferably, said constituent data elements are eight-bit bytes which are transferred by said transfer means in bit-parallel, byte serial manner between the data organising means and formatting means.

The constituent data elements are, for example, interleaved in accordance with the aforesaid DDS format. In this case, a particularly simple form of the first address generator can be implemented, the generator comprising a binary counter with a plurality of counter outputs of increasing binary weightings, and reconfiguration means for reconfiguring said counter outputs into generator outputs providing in binary form said addresses generated by the first generator means, said reconfiguration means being operative to:

pass through the counter output of $2^0$ weighting onto the correspondingly weighted generator output, reconfigure the counter output of $2^1$ weighting onto the $2^1$ and $2^2$ weighted generator outputs, the $2^1$ weighted generator output being inverted or non-inverted in dependence on which track of each pair of tracks associated with a said frame unit, is being transferred by said transfer means, and reconfigure all other counter outputs onto generator outputs of one greater weighting.

Where said constituent data elements are subject to a randomisation process by combination with respective randomising elements that together form a predetermined sequence which is progressive in correspondence with the ordering of said constituent data elements across an uninterleaved frame unit, (this randomisation process being reversed during data retrieval by a complimentary de-randomisation process), the transfer means preferably comprises randomiser means operative to effect said randomisation/de-randomisation process during the transfer of data relevant to one track, the randomiser means in providing appropriate said randomising elements from said predetermined sequence taking account of the distribution of the constituent data elements of said one track across the corresponding frame unit.

Advantageously, the randomiser means is operative to effect byte-wide randomisation/de-randomisation of data and comprises:

a subsequence register for holding a sub-sequence of said pre-determined sequence and having a plurality of outputs the states of which are determined by said sub-sequence and serve to define at least one randomisation/de-randomisation byte, first combinational logic connected to receive both a byte of data being transferred by the transfer means and a said randomisation/de-randomisation byte, and to combine these bytes to derive a randomised/de-randomised data byte, and second combination logic responsive to the states of said register outputs to generate a new subsequence for loading into the register, the new sub-sequence corresponding to the previous subsequence shifted by an amount corresponding to said at least one byte.

Preferably, the randomiser means further comprises:

byte output means responsive to the states of said register outputs to provide a plurality of randomisation/de-randomisation bytes sequentially arranged in said predetermine sequence, the byte output means including combinational logic for predicting bits of said randomisation/de-randomisation bytes not represented by the register outputs; and byte selection means for selecting from said plurality of randomisation/derandomisation bytes, the randomisation/de-randomisation byte to be combined by the first combinational logic with said byte of data, the byte selection means effecting its selection in dependence on which track of each pair of tracks associated with a frame unit, is being transferred by the transfer means.

The aforesaid byte output means is, for example, arranged to provide four randomisation/de-randomisation bytes, the new sub-sequence generated by the second combinational logic corresponding to the previous sub-sequence shifted by thirty-two bits within said predetermined sequence.

Where the data storage apparatus implements the DDS format, the said predetermined sequence corresponds to the output of the linear feedback shift register used in the aforesaid DDS standard to specify the randomising function; in this case, said subsequence is fifteen bits in length.

DESCRIPTION OF THE DRAWINGS

A tape storage device embodying the present invention will now be particularly described, by way of non-limiting example, with reference to the accompanying diagrammatic drawings, in which:

FIG. 1 illustrates the format of a frame written to tape in accordance with the DAT format specification;

FIG. 2A shows the layout of a tape written according to the DDS format;

FIG. 2B shows the composition of a recorded data group written in a data area of the tape layout of FIG. 2A;

FIG. 7 illustrates the composition of a G3 sub-group transferred between the group processor and DAT electronics of the FIG. 3 storage device;

FIG. 8 illustrates one array of twin arrays that form a G4 sub-group produced by the DAT electronics of the FIG. 3 storage device;

FIG. 11 shows the format of track signals transferred between the DAT electronics and a DAT deck of the FIG. 3 storage device;

FIG. 13 is a table showing the allocation of data bytes to address locations within a track RAM memory of the FIG. 12 frame processor;

FIG. 14 is a diagram illustrating the main timing signals used by the FIG. 12 frame processor;

FIG. 15 is a table showing the allocation of data bytes between positive and negative azimuth tracks;

FIG. 16 is a block diagram of a transfer functional block of the FIG. 12 frame processor;

FIG. 20 is a block diagram of a randomiser generator of the transfer functional block of FIG. 16.

BEST MODE FOR CARRYING OUT THE INVENTION

Figure 3:
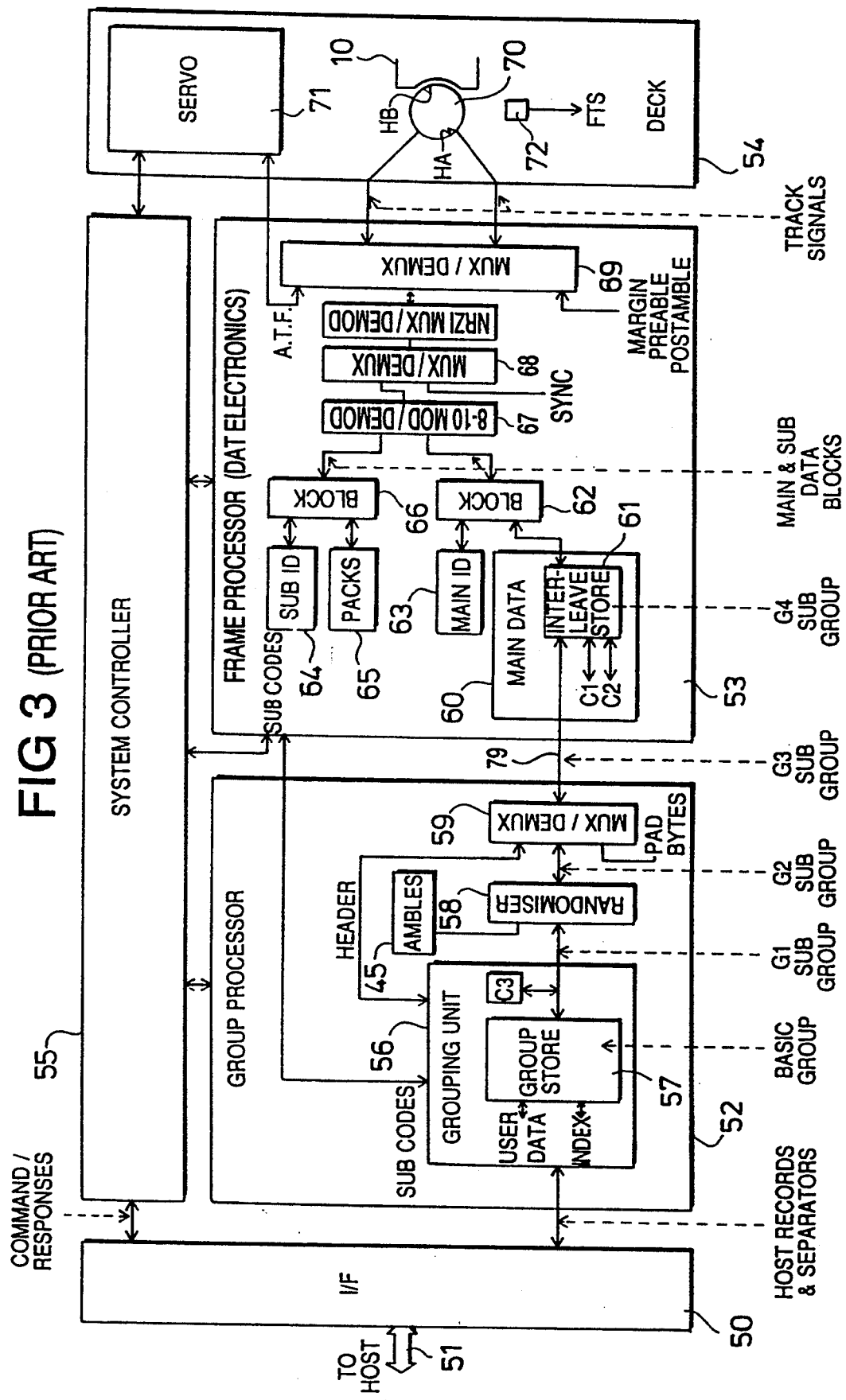
FIG. 3 is a block diagram of a tape storage device arranged to implement the DDS format.

The present invention is described below in relation to a tape storage device that stores and retrieves host computer data on tape generally in accordance with the DDS (Digital Data Storage) Format jointly developed by Hewlett-Packard Limited and Sony Corporation. A detailed specification of the DDS format is given in ISO/IEC Standard 10777:1991 E. The DDS format for the storage of computer data utilises and builds upon the 48 KHz mode of the DAT (Digital Audio Tape) format used for the storage of PCM audio data. The DAT format and, accordingly, the DDS format, both employ a helical-scan recording technique in which tape storage medium is moved obliquely over a rotating head drum with a 90° wrap angle. The drum carries at least two heads which every revolution of the drum together serve to read/write a pair of overlapping, opposite azimuth, tracks known as a frame.

Tape storage devices implementing the DDS format are available, inter alia, from Hewlett-Packard Limited and are generally referred to as DDS drives.

To facilitate an understanding of the present invention, a brief overview of the main features of the DDS format will now be given following by a description of the main functional elements of a DDS drive.

DDS Format Overview

The basic unit for writing and reading information to/from a tape 10 is a frame. FIG. 1 illustrates the format of a frame which, as already mentioned, is made up of two opposite azimuth tracks 20, 21. In FIG. 1, the arrow T indicates the direction of tape movement. Each track comprises two marginal areas 22, two sub areas 23, two ATF (Automatic Track Following) areas 24 and a main area 25. The ATF areas 24 provide signals enabling the heads of the head drum (not shown) to accurately follow the tracks in known manner. The main area 25 is used to store the data (host data) provided to the tape device by the host computer (the host data comprises user data supplied as records by the host computer and separator marks that indicate logical separation of the user data). The sub areas 23 are primarily used to store auxiliary information known as sub codes that relate for example, to certain recording parameters (such as format identity, tape parameters etc), and tape usage history. Data is stored in the main area in 128 blocks, and in each sub area 23 in 8 blocks. Each block starts with a sync byte and has a 3-byte header followed by a 32-byte data area. The block header includes two information bytes W1, W2 one of which is a block address byte that uniquely identifies the block within the current track. The header also includes a parity byte.

The general organisation of frames along a tape (that is, the tape layout) is illustrated in FIG. 2A. As can be seen, the tape is organised into three main areas, namely a lead-in area 36, a data area 37 and an end-of-date (EOD) area 38. The ends of the tape are referenced BOM (beginning of media) and EOM (end of media). Host data is recorded in the main areas of the frames written in the data area 37. The lead-in area 36 includes a system log area, between a beginning-of-recording (BOR) mark and the data area 37, where system information is stored. A tape Area ID sub code stored in the sub area 23 of each frame, enables the system log area, data area 37 and EOD area 38 to be distinguished from one another.

As shown in FIG. 2B, the frames 48 of the data area are arranged in recorded data groups 39 each of twenty two valid frames (plus an optional frame 43—the C3 ECC frame—storing error correction code for the group).

Within a group, user data and separator marks are separately stored, the user data being stored as a continuous run of bytes across the main areas of successive frames without record markers, while information on the division of user data into records and the separator marks are held in an index 40 that extends forwards from the end of the main area of the last frame in the group. (Note that the index will in fact be physically dispersed within the last frame due to a byte-interleaving process employed during recording after formation of the index.)

These recorded data groups are separated from each other by one or more amble frames 44 the main areas of which are optionally filled with a randomised all-zeroes pattern. Ambles are only permitted in the data area 37.

DDS Drive

FIG. 3 is a functional block diagram of a DDS drive. The device comprises:

- an interface unit 50 for interfacing the drive with a host computer (not shown) via a bus 51;
- a group processor 52 for processing user data records and separator marks into and out of indexed groups;
- a frame processor 53 (also referred to herein as DAT electronics) which effects low-level signal processing, generally as specified in the DAT standard, but with certain modifications as specified in the DDS format; this low-level processing serves to convert bytes supplied to it by the group processor 52 into track signals ready for recording and to reconvert track signals back into bytes for the group processor;
- a helical-scan tape deck 54 for writing to and reading from a tape medium; and
- a system controller 55 for controlling the operation of the other elements of the drive in response to commands received from the host via the interface unit 50.

The drive is arranged to respond to commands from the host computer to load/unload a tape, to store a data record or separator mark, to search for selected separator marks or records, and to read back the next record.

The interface unit 50 is arranged to receive the commands from the computer and to manage the transfer of data records and separator marks between the tape storage device and computer. Upon receiving a command from the computer, the unit 50 passes it on to the system controller 55 which, in due course, will send a response back to the computer via the unit 50 indicating compliance or otherwise with the original command. Once the drive has been set up by the system controller 55 in response to a command from the computer to store or read data, the interface unit 50 will also control the passage of records and separator marks between the computer and group processor 52.

As an understanding of the processing effected in a DDS drive will considerably assist an understanding of the present invention, a general description of the functionality of the FIG. 3 drive is given in the next section with reference to FIGS. 3 to 12. However, this next section may be omitted by persons with a good working knowledge of the DDS format.

It should be noted that the FIG. 3 DDS drive and the following related description, disclose a series of functional transformations that data being written to, or read from, tape must undergo in processing by a DDS drive; however, it is not necessary for each functional transformation to be carried out as an explicit separate step but only that the totality of the functional transformation to which data is subject as it passes through the drive corresponds to the combination of the individual transformations illustrated and described with reference to FIG. 3. Thus, the functional blocks illustrated in FIG. 3 may not have any direct equivalent in a particular implementation of a DDS drive, though equivalent functionality will be somewhere provided.

General Description of Functionality of FIG. 3 Drive

A description will now be given of the general operation of the drive in terms of the writing of data to tape; the operation of the drive during reading of data will be apparent to persons skilled in the art as processes are either simply reversed or data assembled during writing to aid the reading process is appropriately put to work during the latter (for example, error-correction codes calculated during writing are used during reading to correct errors).

Figure 4:
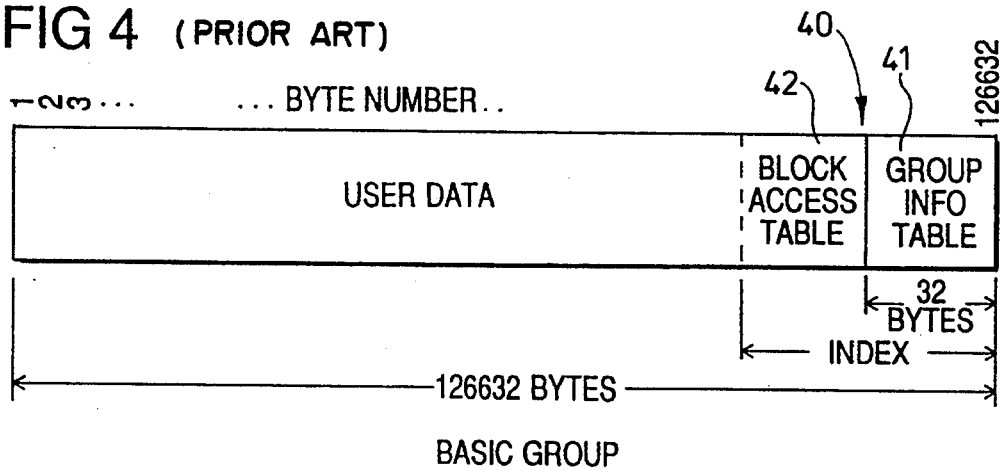
FIG. 4 illustrates a basic group produced by a group processor of the FIG. 3 storage device.

During data storage a grouping unit 56 of the group processor 52 is arranged to organise the data that is provided to it in the form of user data records and separator marks, into data packages referred to as "basic groups". The grouping unit 56 is also arranged to construct the index for each basic group. The unit 56 assembles each basic group in a group store 57. The form of a basic group is illustrated in FIG. 4 and, as can be seen, each basic group comprises 126632 bytes in all divided between user data (without any record marks) and an index 40 grown from the end of the basic group. The index 40 itself comprises two main data structures, namely a group information table 41 storing general information about the basic group (number of records, separator marks, etc), and a block access table 42 containing more specific data on the contents of the group (including information regarding the division of user data into records and the logical location of separator marks). The group information table 41 is stored in a fixed location at the end of the group and is the same size (32 bytes) regardless of the contents of the basic group. In contrast, the block access table 42 varies in size depending on the contents of the group and extends from the group information table backwards into the remainder of the user data area of the frames of the group. Entries are made in the block access table from the group information table backwards to the boundary with user data.

During data writing when the host is ready to pass a data record, the interface 50 asks the grouping unit 56 whether it is ready to receive the record. The grouping unit 56 may initially send a "wait" reply but, in due course, enables the transfer of the data record from the host to the group store 57.

Typically, a host transfers records one at a time although multiple record transfers may be permitted for shorter records.

The record will be transferred to a group store location that corresponds to the eventual positioning of the record user data within the basic group of which it is to form a part. Information on the size of the record is used by the grouping unit 56 to update the group index. The index is constructed in a location in the group store appropriate to its position at the end of a basic group.

If a transfer from the host cannot all fit inside a basic group, it is said to "span" the group boundary. The first part of the transfer goes into one basic group and the rest into one or more subsequent basic groups. If no span occurs, the group index is updated and the grouping unit 60 waits for another write command. If a span occurs, the index of the current basic group is updated and that group is available for writing to tape. The next group is begun and the data from the host goes directly into the beginning of that new basic group. When the host sends a separator mark the grouping unit 56 will update the index of the current basic group accordingly.

The grouping unit 56 also generates certain sub-codes relevant to the current basic group such as the number of separator marks and records received counted from the first group.

Figure 5:
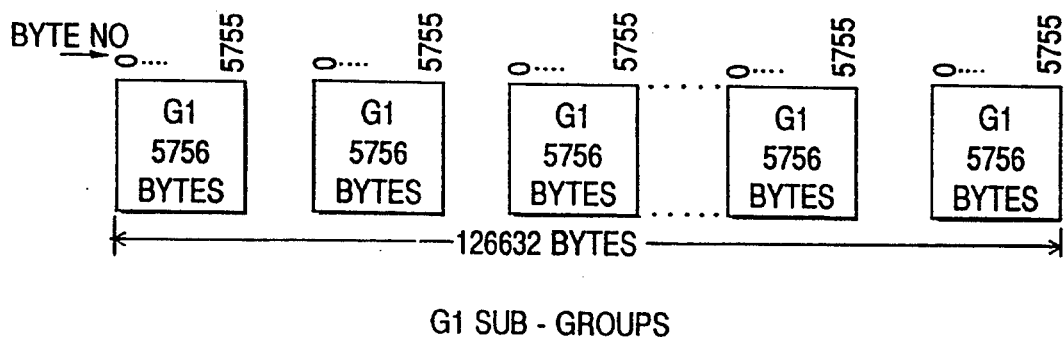
FIG. 5 illustrates G1 sub-groups produced by the group processor of the FIG. 3 storage device.
Figure 6:
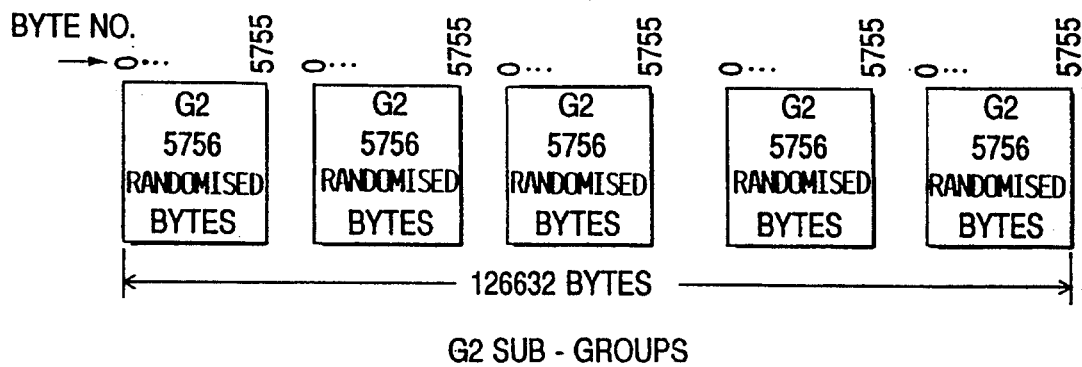
FIG. 6 illustrates G2 sub-groups produced by the group processor of the FIG. 3 storage device.
Figure 9:
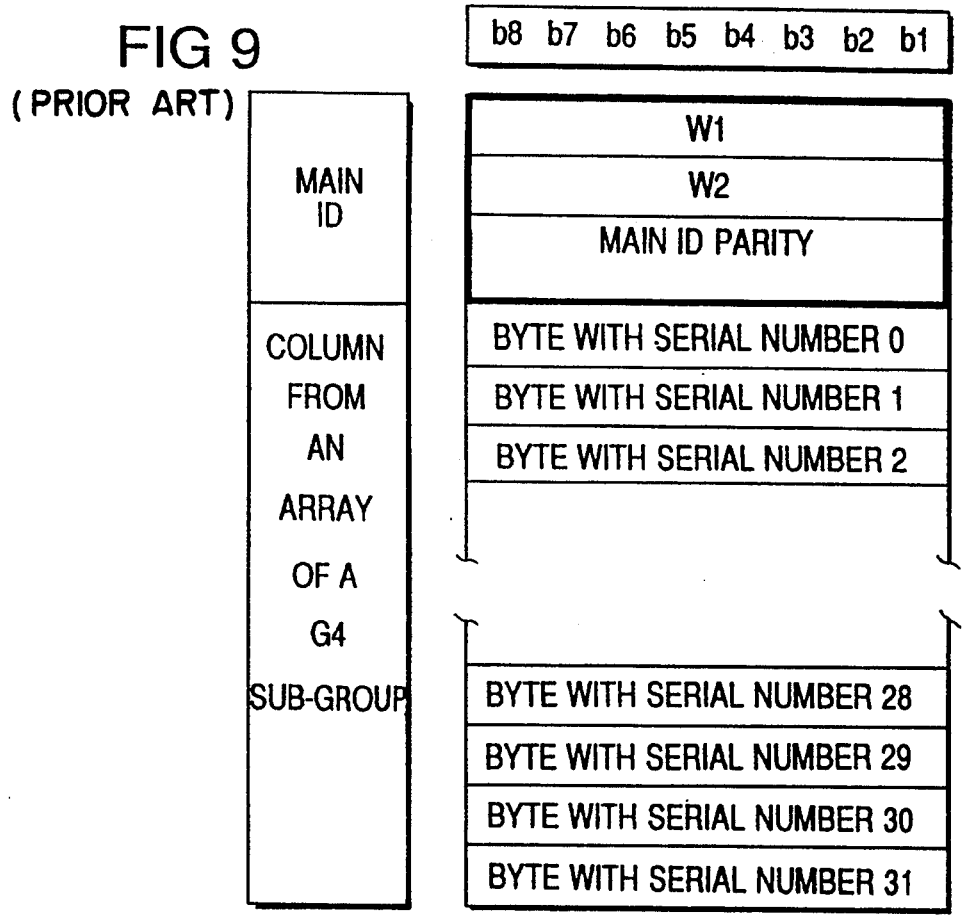
FIG. 9 illustrates the composition of a main data block produced by the DAT electronics of the FIG. 3 storage device.

During data writing, each basic group is transferred out of the group store in twenty two blocks each of 5756 bytes known as G1 sub-groups (see FIG. 5). Each such sub-group eventually forms the data contents of a respective recorded frame. Each G1 subgroup is allocated an identifying number known as the logical frame identification number (LF-ID) which the grouping unit 56 incorporates into a header. This header is subsequently combined into the main data stream along with the associated G1 sub-group (see below).

Optionally, the grouping unit may also calculate an error correction code (C3 code) block for each basic group. This C3 code forms its own G1 sub-group that is appended as a twenty third sub-group to the stream of sub-groups transferred out the grouping unit.

When data is being read from tape, the grouping unit 56 is arranged to receive G1 sub-groups and write them into the group store 57 in such a manner as to build up a basic group. The grouping unit 56 can then access the group index to recover information on the logical organisation (record/entity structure, separator marks) of the user-data in the group. Using this information, the group processor 52 can pass a requested record or separator mark to the host via the interface 50. The assembly of G1 sub-groups back into a basic group is facilitated by the associated logical frame IDs provided to the grouping unit 56 in the headers stripped from the sub-groups earlier in the reading process. Returning now to the description of the data writing process, the G1 sub-groups output from the grouping unit 56 are subject to a randomising process, of known form, in randomiser 58 in order to provide a consistent RF envelope on the read signal, independent of the data pattern in the frame. The output of the randomiser 58 is a succession of G2 sub-groups (see FIG. 6).

One or more amble sub-groups may optionally be added to the end of each group of G1 sub-groups fed to the randomiser 58, the control of amble addition being effected by an amble-control functional unit 45 of the group processor 52. These amble sub-groups are written to tape as amble frames. The contents of an amble sub-group are constituted by zero bytes which after processing (including randomising in randomiser 58) form the contents of the main area 25 of the corresponding amble frame, the only data in these main areas being a header associated with each amble. The main purpose of adding in amble sub-groups is to permit uninterrupted writing by the deck 54 if, for any reason, there is a delay in providing the next following group for writing to the deck. Thus, for example, if there is a delay in providing host data to the processor 52 to complete the next basic group, the unit 45 oversees the insertion of one or more amble sub-groups until such time as the processor 52 can complete the next basic group (or until a time-out has been reached and continuous writing is terminated, whereupon a repositioning operation must occur before the next group is written to tape). Any number of amble frames may be written to tape after a recorded data group.

The header associated with each amble sub-group is generated by the grouping unit 56 when the amble-control unit 45 determines that an amble sub-group is to be inserted. The logical frame ID of the header is set to zero to indicate that the sub-group is an amble sub-group and therefore may be ignored during reading when the sub-group is passed to the group processor 52. The sub codes to be recorded in the sub-areas of an amble frame are also provided by the grouping unit 56 and, in fact, comprise sub codes relevant to the last preceding group.

Following the randomiser 58, a multiplexer/demultiplexer 59 combines each G2 sub-group with its header and with a number of all-zero padding bytes needed to conform the size of each sub-group with the audio data frame size of the DAT format. The output of the mux/demux 59 is constituted by a succession of G3 sub-groups each of 5824 bytes conceptually arranged as illustrated in FIG. 7 (this arrangement and terminology matches the DAT format). More particularly, the bytes are arranged in rows of four as two 2-byte words, each word being labelled either a channel. A word or a channel B word (reflecting the audio associations of the DAT format). The two words in the first row (numbered 0) are constituted by the sub-group header, the words in rows 1 to 1439 are derived from the corresponding G2 sub-group, and the words in rows 1440 to 1455 are the all-zero padding bytes.

As noted above, the header for each sub-group is generated by the grouping unit 56 and is provided in coordination with the output of the corresponding G1 sub-group. The structure of the header of each sub-group can be seen from FIG. 7. Again, as already noted, the header contains a Logical Frame ID (LF-ID); this ID is a one byte code stored in the upper byte position of both channels A and B. The first six bits of the LF-ID indicate the running number of each sub group within a group (1 to 23, the optional C3 frame being frame 23) or is set to zero for an amble frame. Bit seven of the LF-ID is set to ONE to indicate the last sub-group of a group (inclusive of any C3 sub-group). Bit eight of the LF-ID is set to ONE only for a C3 sub-group. In addition to the LF-ID, the header includes a four-bit data format ID (stored in the lower byte position of both channels A and B) which for the DDS format is set to 0000.

The G3 sub groups are passed to a main data processor 60 of the DAT electronics 53 where they are processed substantially in accordance with the 48 KHz mode of the DAT format. More particularly, the bytes of each G3 sub-group undergo an interleaving process to form twin arrays as they are fed into an interleave store 61 of the main data processor 60. This interleaving miniraises the effects of certain media defects. Two sets of error correcting codes (C1 and C2) are then generated and inserted into the twin arrays held in store 61. FIG. 8 illustrates the conceptual form of one of these twin arrays that together constitute a G4 sub group. As can be seen from FIG. 8, each array of a G4 sub group is formed by 128 columns each of 32 bytes. After further processing in the DAT electronics 53, the two arrays of a G4 sub-group will form the contents of the main area of respective tracks of a frame.

Each array of a G4 sub-group is next formed into 128 main data blocks (see FIG. 9) each of 35 bytes by combining the 32 bytes of each array column with a three-byte Main ID in a block multiplexer/demultiplexer 62. The Main ID bytes are provided by a main ID unit 63 and are constituted by two bytes W1, W2 and a parity byte. Byte W1 contains format ID and frame number information and byte W2 contains a block number identifying the current main data block within the set of 128 blocks derived from each G4 sub-group array.

By the foregoing process, each basic group is transformed into 22 pairs of 128 main data blocks (that is 5632 main data blocks) with a further pair of 128 blocks for the C3 and each amble sub-group if present.

In parallel with the generation of the main data blocks, 35-byte sub-data blocks are also generated that contain sub codes supplied to the DAT electronics 53 from the group processor 52 and system controller 55. Thirty two sub-data blocks are generated for each G4 sub group processed (that is, 8 blocks for each of the two sub areas 23 of the two tracks into which the G4 sub group is to be written).

Figure 10:
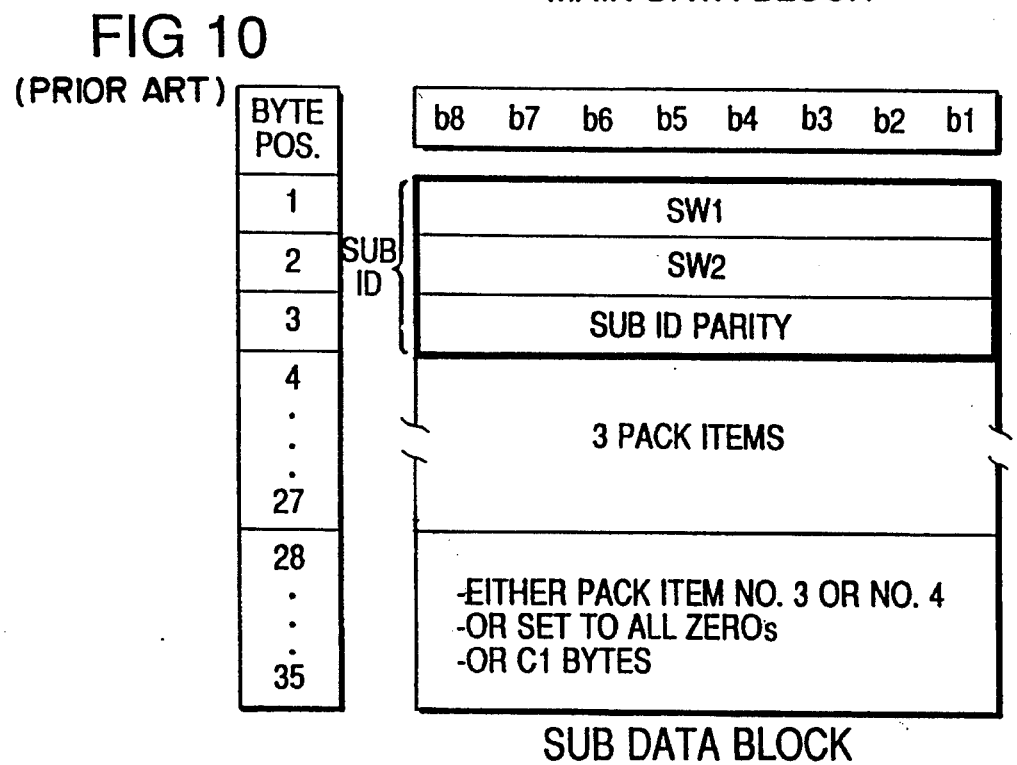
FIG. 10 illustrates the composition of a sub data block produced by the DAT electronics of the FIG. 3 storage device.

The structure of a sub-data block is illustrated in FIG. 10. Each sub data block comprises a three-byte "Sub ID" section 33 and a thirty-two byte "Sub Data" section.

The Sub ID is generated in a sub ID unit 64 and is composed of two information-containing bytes SW1, SW2 and a parity byte. Byte SW2 is used for storing information relating to the current sub data block as a whole (type and address) and the arrangement of the Sub Data section. Byte SW1 is used for storing sub codes and in particular, the Area ID indicating the current tape area (this sub code is supplied by the system controller 55).

The Sub Data section of each sub data block is generated in unit 65 and is composed of thirty two bytes arranged into four eight-byte "packs". Each pack is used to store a pack item; there are a number of different types of pack item each holding a particular set of sub codes. The mapping of pack items into the sub data packs is dependent on the current tape area and not all pack items will be present in any given tape area. The identity of the pack item held in a sub-data pack is indicated by a pack-item code that occupies the first half byte of each pack item stored in a pack. With regard to the fourth pack, for every even block this pack is either set to zero or contains the same pack item as the third pack, while for every odd block the fourth pack contains a C1 parity byte for the first three packs of the current block and all four packs of the preceding even-numbered sub-data block.

By way of example, pack items coded 1 and 2 contain group, separator, and record counts while pack items 3 and 4 both contain area ID, absolute frame number, LF-ID and check sum data. Pack 3 of every odd sub data block contains pack item 3 while pack 3 of every even sub-data block contains pack item 4.

Certain of the sub code data stored in the packs are cumulative totals of events (such as number of groups) taken from BOR. This is made possible by storing historical data on such events in the packs of the system log area at the end of each tape usage session and then retrieving this data at the start of a new session.

The sub-ID bytes and the packs of the sub-data section are assembled into sub-data blocks by a sub-data block multiplexer/demultiplexer 66.

The final step in the writing process is to generate the track signals containing the main data blocks and sub data blocks. In order to avoid undesirable flux transitions, each 8-bit byte of the main data and sub-data blocks is transformed into a suitable 10-bit pattern, the resultant bits being termed "channel bits". This transformation is carried out by the 8–10 transformation unit 67 shown in FIG. 3.

After this transformation, a predetermined 10-channel-bit sync field is added to the front of each transformed main data and sub data block thereby forming 360-channel-bit blocks referred to as "recorded main data blocks" and "recorded sub data blocks" respectively. This operation is carried out by multiplexer/demultiplexer 68.

Finally, the recorded data blocks are combined with other types of 360-channel-bit recorded blocks (described below) in multiplexer/demultiplexer 69 to form track signals to be fed alternatively to the head HA and HB of the head drum 70 of the deck 54.

The sequence of recorded blocks does, of course, determine the format of each track (this format has already been described in general terms with reference to FIG. 1). A more detailed break down of the composition of each track in terms of recorded blocks is shown in FIG. 11. As can be seen, each track contains 196 recorded blocks with the 128 recorded main data blocks corresponding to one array of a G4 sub-group, being recorded between two groups of eight recorded sub data blocks. In addition to these recorded main data blocks and recorded sub data blocks, the following recorded block types are present:

Margin block, preamble blocks and postamble blocks (repeated channel bits pattern "111")

Spacer blocks (repeated channel bits pattern "100")

ATF blocks (predetermined frequency patterns).

The helical scan tape deck 54 is of standard form compliant with DAT specifications and will not be described in detail herein. The low-level control of the deck is effected by a servo unit 71 which itself is controlled by the system controller 55. The unit 71 also indicates beginning-of-media (BOM) and end-of-media (EOM) conditions to the controller 55. Included within the servo unit 71 is automatic track following (ATF) circuitry that, during writing, generates the ATF blocks and, during reading, utilises the ATF signals provided by the heads HA, HB to ensure proper alignment of the heads with the tracks recorded on the tape.

The deck 54 also has a pulse generator 72 arranged to generate a pulse output once every revolution of the head drum 70. This pulse output constitutes a frame timing signal FTS as each drum revolution corresponds to the reading/writing of one frame. The FTS signal is phased to mark the beginning of each frame and is used to synchronise the operation of the DAT Electronics and the transfer of data to/from the grouping unit 56, with the operation of the deck 54.

It will be appreciated that the foregoing description of the FIG. 3 drive has concentrated on the functional components of the drive rather than any particular implementation of this functionality. In practice, the processes of the group processor 52 and DAT electronics 53 can be implemented by respective controlling microprocessors with associated application-specific circuitry.

The functioning of the drive during the reading of data is substantially a reverse of the above described write operation but with certain of the auxiliary data assembled during writing being utilised to aid the reading process (for example, error correction codes, block addresses, logical-frame ID).

Furthermore, as well as normal-speed writing and reading, the drive will generally be provided with a fast search capability involving reading the sub areas of occasional frames to locate a desired record.

Implementation of Frame Processor Functionality

Figure 12:
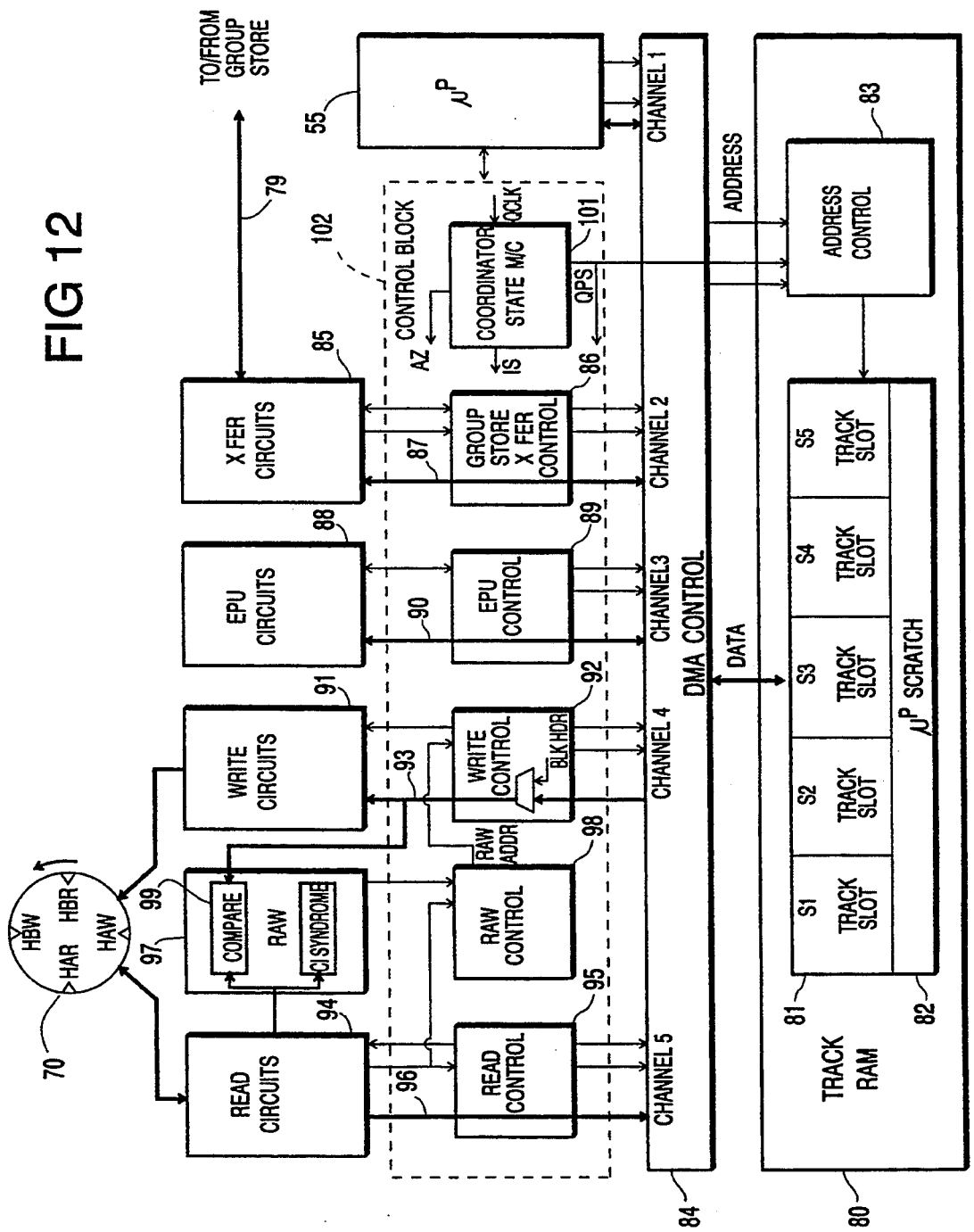
FIG. 12 is a block diagram of a preferred implementation of the frame processor function of the FIG. 3 storage device.

Having described the general functionality provided by a DDS drive, a preferred implementation of the frame processor will now be considered with reference to the block diagram of FIG. 12.

The FIG. 12 frame processor operates autonomously to transfer a frame of data from the group processor 52 to the head drum 70, or vice versa, once instructed by the system controller 55 to effect the transfer; in the present embodiment, the system controller is constituted by a microprocessor as indicated in FIG. 12. In carrying out the transfer of a frame of data, the FIG. 12 frame processor is arranged to exchange data with the group store 57 of the group processor 52 (FIG. 3) via a byte-wide bus 79 and on a track-by-track basis; this contrasts with previously known arrangements where data is transferred to and from the frame processor in a bit serial manner and on a frame-by-frame basis.

Furthermore, the FIG. 12 frame processor is intended to carry out read-after-write checking of data written to tape and accordingly is intended to operate with a head drum 70 provided with four heads, namely two write heads HAW and HBW and two read heads HAR and HBR. Each head scans the tape for one quarter of a revolution of the head drum 70 with the write head HAW being followed by the corresponding read head HAR and the write head HBW being followed by the read head HBR when the head drum is rotated in its intended direction, indicated by an arrow in FIG. 12. The geometry of the head drum is such that a track written by a write head HAW/HBW is read one and a quarter revolutions later by the corresponding read head HAR/HBR.

The FIG. 12 frame processor comprises a track RAM memory 80 corresponding generally to the interleave store 61 of FIG. 3. The track RAM 80 comprises a memory area 81 divided into five track slots S1-S5 each for holding data associated with a respective track and a memory area 82 serving as a scratch pad area for the microprocessor 55. In addition, the track RAM 80 comprises an address control unit 83.

The track RAM 80 serves to hold data and sub-codes whilst these are processed into and out of the aforedescribed track format by the FIG. 12 Frame Processor. Access to the track RAM 80 is governed by a DMA control unit 84 which at any one time allocates access to one of five channels, channel 1 being associated with the microprocessor 55 and channels 2-5 being associated with respective functional blocks of the frame processor.

The main functional blocks of the FIG. 12 frame processor are as follows:

Firstly, a transfer functional block comprising transfer circuits 85 and a transfer control unit 86, is operative to exchange data with the group processor 52 via the byte-wide bus 79, an internal bus 87 of the transfer functional block being connected to channel 2 of the DMA control unit 84.

A second functional block of the FIG. 12 frame processor performs an error processing function and is constituted by EPU circuits 88 and an EPU control unit 89, a data bus 90 of this functional block being connected to channel 3 of the DMA control unit 84.

A third functional block of the FIG. 12 frame processor is formed by a write chain constituted by write circuits 91 and a write control 92, a write data bus 93 of this write chain being connected to channel 4 of the DMA control unit 84.

A fourth functional block of the FIG. 12 frame processor forms a read chain constituted by read circuits 94 and a read control 95 with a read bus 96 of this functional block being connected to channel 5 of the DMA control unit 84.

A fifth functional block of the FIG. 12 frame processor forms a read-after-write (RAW) function block constituted by RAW circuits 97 and a RAW control 98. This functional block is not directly connected to a DMA channel of the unit 84 but, as will be described more fully below, is arranged to access data in the track RAM 80 through the write chain and to write data into the track RAM 80 through the read chain.

The control units 86, 89, 92, 95 and 98 of the functional blocks the FIG. 12 frame processor are sequenced and controlled by a coordinator 101 constituted, in the present embodiment by a controlling state machine; the coordinator 101 and the control units together form a control block 102. The coordinator 101 is itself in turn, controlled by the microprocessor 55, the latter instructing the former to transfer a frame of data either to or from the group processor. Thus, there can be seen to be a hierarchy of control with the microprocessor 55 at the top level, the coordinator 101 at the next level and the control units 86, 89, 92, 95 and 98 at the lowest level.

In general terms, during data storage the microprocessor 55 will instruct the coordinator 101 to oversee the transfer of a frame's worth of data from the group processor 52 to the head drum 70. The coordinator 101 coordinates the various functional blocks of the FIG. 12 processor, through their corresponding control units, to carry out the appropriate tasks to effect the transfer requested. These tasks include the transfer in of data from the group processor 52 on a track-by-track basis (effected by the transfer functional block 85, 86), the generation of error correcting codes for each track's worth of data (effected by the EPU functional block 88, 89), and the formatting of each track's worth of data together with sub-codes, block headers and other signals to form a track signal for passing to the head drum 70 (effected by the write chain 91, 92). Where read-after-write checking of data written to tape is carried out, then the coordinator 101 also oversees the reading back of data from tape through the read circuit 94 from where it is fed to the RAW circuits 97 for comparison with the original data which has been retained in the track RAM 80 and is now passed via the write chain to the RAW circuits 97. The results of the RAW check are passed through the read circuits 94 to the track RAM 80.

Because the microprocessor 55 has access to the track RAM 80, it can write into the track RAM the G3 sub-group header information (see FIG. 7) and the various subcodes which need to be assembled with the main data for writing to tape. Furthermore, the track RAM 80 is also used to communicate the results of the RAW check from the RAW functional block to the microprocessor 55. During data retrieval, the microprocessor 55 instructs the coordinator 101 to oversee the transfer of a frame of data from tape to the group processor 52. The coordinator 101 carries out this instruction by controlling the various functional blocks of the frame processor, through their control units, such as to read two tracks of data through the read chain 94, 95 into the track RAM 80, to carry out error checking and correction by reading data out from the track RAM 80 through the EPU functional block 88, 89 and returning the data to the track RAM 80, and finally to transfer data out from the track RAM 80 to the group processor 52 through the transfer functional block 85, 86.

During data storage/retrieval, data relating to a particular track is stored in the same associated track slot throughout the whole of the processing of that track by the frame processor. The allocation of tracks to track slots is effected by the address control unit 83 on a cyclic basis. The identity of the track slot which each functional block is allowed to access during any frame quarter period Q is controlled by the control unit 83 in dependence on the current state of the coordinator state machine 101 and on the identity of the accessing functional block such that the track data is appropriately sequentially processed by the functional blocks. Within each track slot, the memory location addressed is set by a slot offset address provided by the accessing functional block. It should be noted that in a preferred implementation of the frame processor, main and sub zone data is stored in each track slot in an ordering that expedites transfer of data to and from the EPU functional block 88, 89 during C1 processing this being achieved by ordering the bytes so as to facilitate word transfers (that is, two adjacent bytes) rather than single byte transfers between the track RAM and the EPU functional block. This ordering differs from the ordering of data bytes in the blocks of the main and sub zones of a track due to the fact that an interleave depth of two is specified in the DDS format for C1 ECC processing. By way of example, FIG. 13 illustrates the disposition of data bytes in a track slot for data relevant to the first two blocks of the main zone of a track, the subscript notation used for data bytes $D_{a,b}$ being that "a" represents the block number within the main zone and "b" represents the byte number within the data area of the current block. As can be seen, data bytes $D_{0,0}$ and $D_{0,2}$; $D_{0,4}$ and $D_{0,6}$; $D_{0,8}$ and $D_{0,10}$ etc are all stored in adjacent locations and therefore can be accessed by word transfers by the EPU functional block 88,89 during C1 ECC processing where these byte pairs are successively processed. It will be appreciated that the transfer functional block and microprocessor 55 are operative to read/write main and sub data to/from the track RAM according to the FIG. 13 ordering and that the read and write chains appropriately adjust the ordering of data bytes in transferring data between the track RAM and tape.

As applied to the illustrated tape storage device, the present invention is concerned with the transfer of data between the group processor 52 and the FIG. 12 frame processor, this transfer being effected in relation to the FIG. 12 frame processor by the transfer functional block 85, 86. Accordingly, a detailed description will not be given of the other functional blocks of the frame processor nor of the coordination of their operation as these matters do not affect the operation of the transfer functional block.

Before a more detailed consideration is given to the transfer functional block 85, 86, consideration will first be given to the more important timing signals used to control the operation of the FIG. 12 frame processor and which are made appropriately available to the coordinator 101 and the control unit 86 of the transfer functional block.

More particularly, a first group of tinting signals are derived from rotation of the head drum and are used to synchronize the frame processor with the head drum, these signals being shown in FIG. 14. FIG. 14(a) shows the frame timing signal FTS generated off the head drum via the sensor 72 (FIG. 3), a timing pulse being generated once every revolution of the drum near the start of the scanning of the tape by the write head HAW. The period of the frame timing signal is referenced as $t_F$, this being the period required for one frame (2 tracks) to be written to/read from tape. The time difference between the occurrence of FTS and when the head HAW first starts to scan the tape is measured during calibration of the drive and then used by timing circuitry (not shown) to generate a head swap signal SWP (see FIG. 14b) from the signal FTS, the signal SWP being high when the write and read heads HAW and HAR are over the tape and low when the write and read heads HBW and HBR are over the tape. The period of the SWP is also $t_F$. As shown, each head is over the tape for one quarter of the frame period $t_F$; this quarter period $t_F/4$ for which each head is over the tape will hereinafter be generally referred to as of duration Q.

The timing circuitry is also used to generate a signal QCLK shown in FIG. 14(c). The signal QCLK is a clocking signal of period Q which is used to synchronize the coordinator 101 to the head drum 70, each clock signal QCLK causing the coordinator state machine to change its current state.

In addition to the foregoing timing signals that serve to coordinate the frame processor electronics to the head drum, there is, of course, an internal system clock signal SYSCLK generally determining the processing speed of the frame processor functional elements. (Processing speeds in the read and write chain are however determined by respective write and read clocks, the write clock being an internal clock set to the intended data rate of the write chain, and the read clock being a phased-locked loop locked to the signal read from tape).

Three other important control signals used in the FIG. 12 frame processor, are an azimuth signal AZ, a quarter-period state signal QPS, and an initiate processing signal IS, all of which are generated by the coordinator 101. The azimuth signal AZ is a binary signal set in one state during the first two quarter periods following the microprocessor 55 instructing the coordinator 101 to oversee the processing of a frame, and into its other state during the following two quarter periods; the significance of each state of the azimuth signal will depend on the receiving functional block and may indicate that a positive azimuth track is to be processed by one block whilst simultaneously indicating to another block that a negative azimuth track is to be processed. The azimuth signal AZ thus serves a synchronizing role.

The signal QPS performs a synchronizing and sequencing role in that it is used to indicate to the functional blocks of the frame processor, the current state of the state machine. The signal is generated by the coordinator at the start of each quarter period upon the coordinator state machine entering each new stale and is fed to each of the functional blocks that are to be active in that coordinator state, in order to initiate processing by that block. It will be appreciated that the functionality of the signals QPS and IS could be provided in other ways, for example by a respective initiation signal for each type of operation to be effected by each block, that signal being activated upon the coordinator entering the corresponding state.

Transfer Functional Block

The transfer of a track's worth of data to/from the group processor is arranged to be effected over a period equal to 2Q (that is half the frame period $t_F$) this of course corresponding to the rate at which tracks are written to/read from tape.

When the microprocessor 55 instructs the frame processor to transtar a frame of data to/from the group store, it passes the coordinator 101, the identity of the relevant group within the group store 57 and this information is made available to the transfer functional block 85, 86 to enable the latter to access the appropriate group in the group store 57 of the group processor 52. Of course, the transfer functional block 85, 86 also needs to know the logical frame number of the frame being processed in order to appropriately access the group store 57. The logical frame number is made available to the transfer functional block by being written in the appropriate byte location of the relevant track RAM slot (the logical frame number LF-ID forms part of the header of each G3 sub group); during data storage, it is the microprocessor 55 which writes the LF-ID into the relevant track slot whilst during data retrieval the LF-ID is written into the relevant track slot by the read chain as it is read back from tape. The transfer functional block 85, 86 accesses the LF-ID at the start of each cycle of its operation by a DMA access to the appropriate location of the relevant track slot.

As already indicated, data is transferred to and from the group store of the group processor over a byte-wide bus 79 on a track-by-track basis, that is the transfer of data in respect of one track is completed before the transfer of data in respect of the next track is initiated. This arrangement contrasts with existing DAT based storage devices where data transfer is effected on a frame-by-frame basis. According to the DAT format specification, serially supplied data is interleaved between the two tracks making up a frame in order to minimize the effect of tape imperfections, data errors in one track being in many circumstances recoverable on the basis of the data in the other track of the same frame. FIG. 15 shows the allocation of data bytes of a G1 subgroup (sequentially numbered D0, D1 upwards) between positive and negative azimuth tracks. Furthermore, not only is data interleaved across a whole frame but the randomising function carried out by the randomizer block 58 in FIG. 3 is also carried out on a frame by frame basis, the DDS Format Standard specifying the randomizing function in terms of a linear feedback shift register that is re-initialized at the start of each frame (that is, before each G1 sub group is transferred to/from the group store 52), the output of this register being combined with data sequentially transferred to/from the group store.

Because of this randomising and interleaving of data across a frame, it is clearly more straight forward to transfer data on a frame-by-frame basis, as this simply requires the strict sequential access of data held in the group store 57 with randomising and interleaving being effected according to the standard functions specified for DDS. However, transfer of data on a frame-by-frame basis has the effect of increasing the latency of the frame processor which in turn results in a greater storage requirement for the frame processor.

For this reason, the transfer functional block 85, 86 of the FIG. 12 frame processor is arranged to transfer data on a track-by-track basis to/from the group store 57 of the group processor and, in order to do so, appropriate circuitry must be provided to access the group store and the track RAM 80 in the appropriate sequential manner as required for a track-by-track transfer, and special measures are also required to ensure that randomization (and de-randomization) of the transferred data is effected in accordance with the DDS format standard.

It should be noted that although the functionality of the randomizer 58 is shown in FIG. 3 as part of the group processor 52, in terms of practical implementation, it is more convenient to include the randomizer function in the transfer block of the frame processor. (It may further be noted that the functionality of the multiplexer/demultiplexer 59 of FIG. 3 which is there shown to be part of the group processor, is also effectively incorporated into the FIG. 12 frame processor in that the header of each G3 sub-group and the pad bytes are directly written into the appropriate slot of the track RAM 80 at the instigation of the micro-processor 55 and are not transferred over the bus 79 from the group processor with the user data).

The transfer functional block 85, 86 is shown in FIG. 16 and includes a byte-wide exclusive OR circuit forming the transfer circuits 85, which is interposed between the byte-wide bus 79 connected to the group store 57 and the internal bus 87 associated with channel 2 of the DMA controller. This byte-wide exclusive OR circuit 85 carries out an exclusive OR operation on each bit of a data byte provided to it on bus 79/87 with the corresponding bit of a randomizer byte supplied from a randomizer generator 125, the resultant modified byte being output on the other of the buses 87/79; more particularly, during data writing, data passes from the bus 79, is randomized in the circuit 85 and is then output on bus 87 whilst during data reading, a randomized byte is supplied by bus 87, is de-randomized by circuit 85 and output on bus 79. The exclusive OR circuit 85 is the only circuit of the transfer block that performs modification on the data itself, all the other circuits of the transfer block being concerned with address control or generation of the randomizer bytes.

The transfer control unit 86 comprises three main control function elements, namely a track byte address generator 124 for generating the appropriate address for the next access to the group store 57 of the group processor 52, a slot interleave address generator 126 for generating the address within a slot (the slot offset) for the next access to the track RAM 80, and the randomizer generator 125 for supplying randomizer bytes to the exclusive OR circuit 85. These generators 124, 125 and 126 are controlled by a state machine 123 that has an associated transfer clock circuit 122. When triggered by the signal IS from the coordinator 101 at the start of a quarter period when data is to be transferred, the state machine 123 first initiates a DMA access into the track RAM to retrieve the logical frame number LF-ID of the track to be transferred; thereafter, the state machine 123 oversees the transfer of those data bytes from a G1 sub-group that are associated with the particular track being processed, this transfer being effected in the direction between the group store 57 and track RAM 80, that is indicated by the signal QPS from the coordinator 101 (or a related signal indicating whether data is being stored or retrieved). The basic task of the state machine 123 during byte transfer is to coordinate the various handshake procedures necessary to transfer a data byte to/from the group store 57 and to/from the track RAM 80 (via DMA channel 2), the state machine cycling through the necessary handshake control operations once for every byte being transferred. As each byte transfer is complete, the state machine 123 causes the transfer clock circuit 122 to increment a base counter 139 to keep a tally of the number of bytes so far transferred in the current transfer quarter period and also to output a transfer clock pulse XFERCLK and, every other byte transfer, a clock pulse XFERCLK/2; these clock pulses are used in controlling the timing of the generators 124, 125 and 126 as will be more fully described below.

The state machine 123 continues cycling around its states controlling the transfer of each byte in the appropriate direction between the group store 57 and track RAM 80 until the base counter 139 indicates that 2878 bytes have been transferred (that is, the total number of bytes from bytes D0–D5755 associated with one track) whereupon it ceases its byte transfer operation, outputs a signal RST to reset the generators 124, 125 and 126 and then returns to an idle state awaiting the next triggering from the coordinator 101.

The detailed operation of the state machine 123 in terms of the handshake control for effecting a byte transfer to/from the group store 57 and the track RAM 80 will not be described in detail herein as appropriate implementations will be apparent to persons skilled in the art.

For each byte transferred, the track byte generator 124 generates the appropriate address within a frame for accessing the group store 57 (the group and frame identifies being added from the coordinator 101 and track RAM in dependence on information supplied from the microprocessor 55), the randomizer generator 125 generates the appropriate byte for randomizing/de-randomizing the data byte being transferred, and the slot interleave address generator 126 generates the appropriate slot offset for accessing the track RAM 80. Each of these generators 124, 125 and 126 will now be described in more detail.

Figures 17, 18:
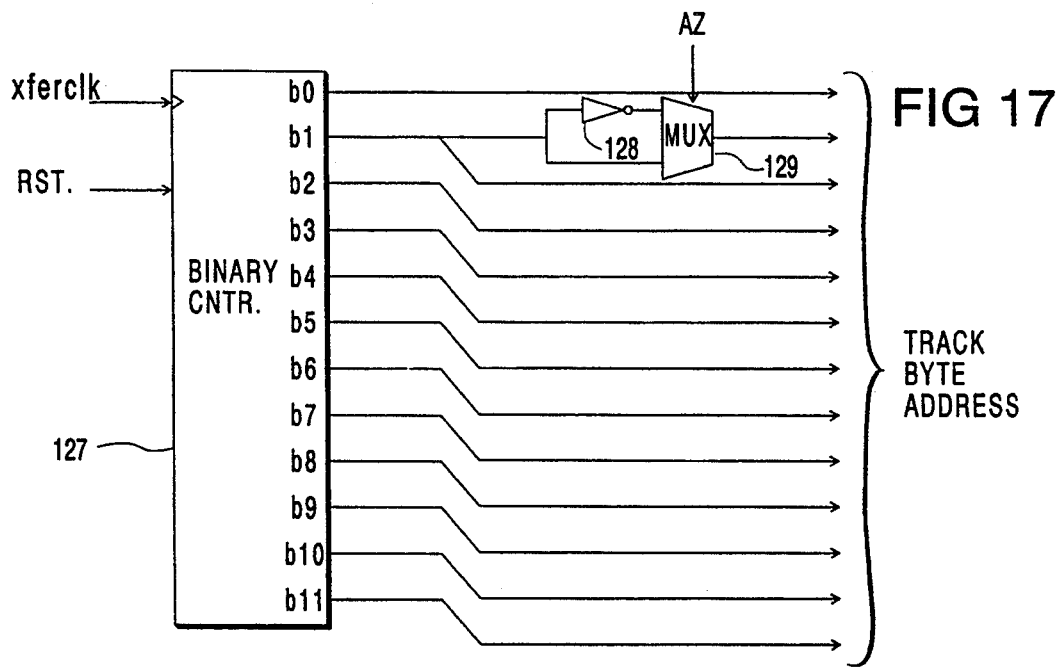
FIG. 17 is a diagram of a track byte address generator of the transfer functional block of FIG. 16.
FIG. 18 is a table showing the sequences of addresses generated by the address generator of FIG. 17.

Considering first the track byte address generator 124, this generator is required to generate a sequence of addresses for accessing the group store 57 corresponding to the sequence of byte addresses for the positive azimuth track or negative azimuth track within a G1 sub-group, this ordering being that illustrated in FIG. 15. The circuitry of FIG. 17 illustrates a particularly simple way of generating the appropriate address sequences. A binary counter 127 is clocked by the transfer clock signal XFERCLK, this counter being reset to zero by the signal RST at the end of each track transfer operation. The counter 127 is a 12-bit counter with bit outputs b0 to b11, the output b0 being the least significant bit. The left hand column of the FIG. 18 table shows the output bit values for b0 to b5 as the counter is clocked from its reset state for sixteen clock pulses, the decimal equivalent of the binary output being shown in the adjacent column of the FIG. 18 table. In order to generate the appropriate sequences of track byte addresses, it is only necessary to use the output from b1 both to provide the $2^1$ and $2^2$ weightings of the track byte address and to increase by one the significance of each of the outputs b2 to b11. In providing the $2^1$ bit of the track byte address, the output b1 is either taken directly or inverted (by inverter 128) in dependence on the azimuth of the track concerned, the appropriate form of b1 being selected by multiplexer 129 controlled by the azimuth signal AZ supplied from the coordinator 101 with the inverted form of b1 being selected for positive azimuth tracks.

FIG. 18 shows the effect of this modification of bit weightings on the resultant track byte address for both positive and negative azimuth tracks. It will be seen that the resultant addresses advanced in a manner corresponding to that required by FIG. 15 to select the data bytes appropriate for each track. The track byte address is then combined with the group and frame identities supplied from the coordinator 101 and is then used to access the group store 57.

Figure 19:
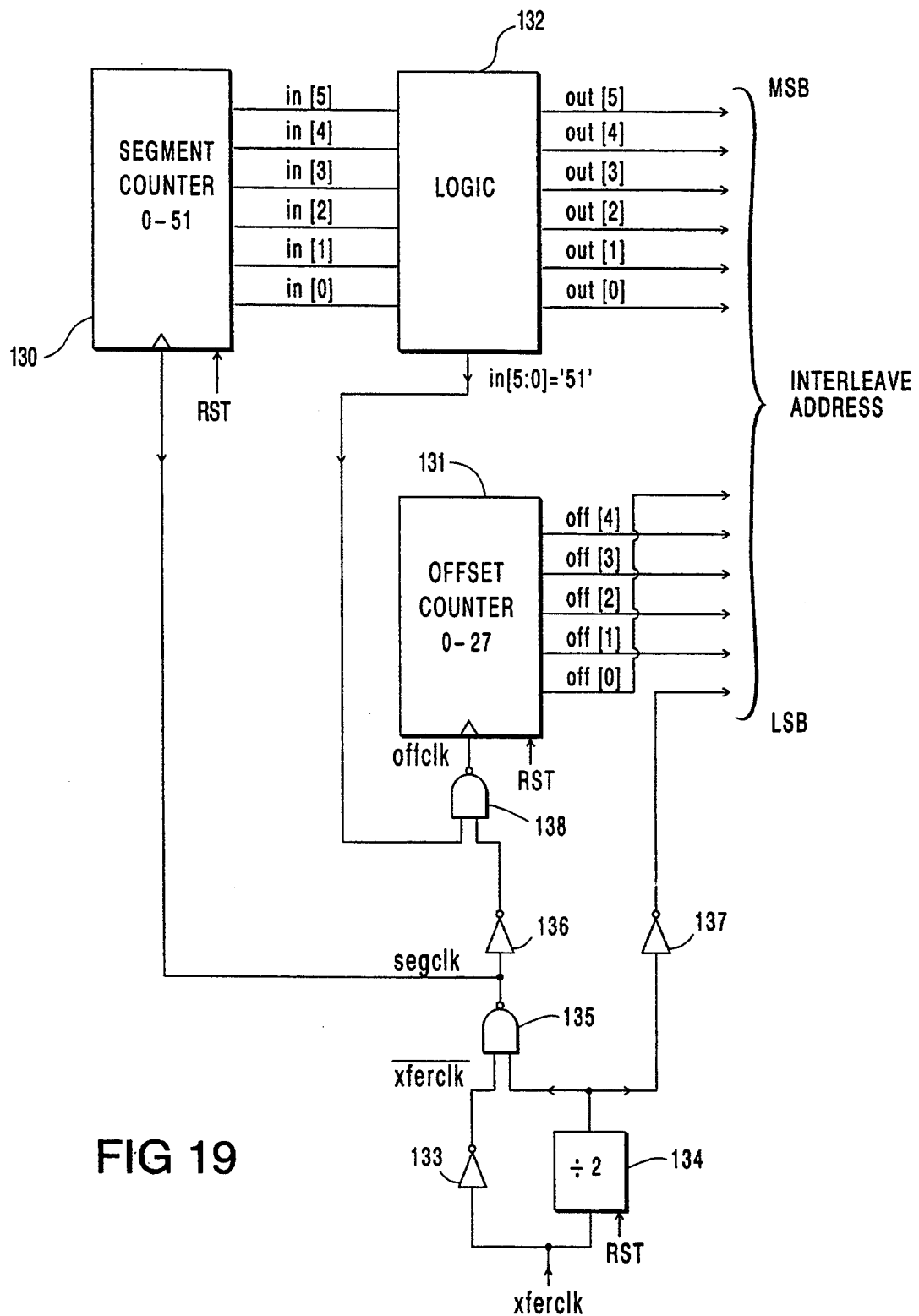
FIG. 19 is a block diagram of a slot interleave address generator of the transfer functional block of FIG. 16.

The interleave address generator 126 is shown in FIG. 19, the purpose of this address generator being to ensure that track data bytes are inserted/extracted from the appropriate track slot in an order effecting interleave/de-interleaving in accordance with the DAT standard; in addition, in generating interleave addresses, the interleave address generator 126 takes account of the byte ordering requirements, discussed above with respect to FIG. 13, for facilitating word transfers between the EPU functional block and the track RAM during C1 ECC processing. The interleave formula of the DAT standard is based on values of 52 and 28 and accordingly, the FIG. 19 circuit is provided with a segment counter 130 for counting from 0 to 51 and an offset counter 131 for counting from 0 to 27. Both counters are reset to zero by the reset signal RST produced by the state machine 123 of FIG. 16. In general terms, the segment counter 130 is clocked by a signal "SEGCLK" at half the rate of the clock signal XFERCLK, whilst the offset counter 131 is incremented each time the segment counter 130 reaches its counter value of 51. The generation of the clocking signals for the counters 130 and 131 is controlled by logic gates 133, 135, 136, 138 and a D-type flip flop 134, the latter being clocked by the signal XFERCLK.

The interleave address is generated from the outputs "in[0]" to "in[5]" of the segment counter 30 after transformation by logic circuitry 132 to form signals "out[9] to "out[5], the outputs "off[0] to "off[4]" of the offset counter 131 and the output of the D-type flip flop 134 after inversion by an inverter 137. The ordering of the signals making up the interleave address is as shown in FIG. 19. The logic circuitry 132 is also used to determine when the outputs of the segment counter 130 indicates a counter value of 51 (this state being depicted in FIG. 19 by "in[5:0]=51").

The transformation of the signal "in[]" to the signals "out[]" effected by the logic circuitry 132 is in accordance with the following logic statements:

```
out[0] = in [1];
out[1] = (in[0] AND NOT in[2] AND in[3] AND in[4] AND NOT in[5]) OR
         (NOT in[0] AND in[2] AND in[4] AND NOT in[5]) OR
         (NOT in[0] AND in[2] AND NOT in[4]) OR
         (in[0] AND NOT in[2] AND in[3] AND NOT in[4]) OR
         (in[0] AND NOT in[2] AND NOT in[3]);
out[2] = (in[2] AND in[3] AND NOT in[5]) OR
         (in[2] AND in[3] AND NOT in[4]) OR
         (NOT in[0] AND in[3] AND in[4] AND NOT in[5]) OR
         (NOT in[0] AND in[3] AND NOT in[4]) OR
         (in[0] AND NOT in[2] AND NOT in[3]);
out[3] = (NOT in[0] AND in[3] AND in[4] AND NOT in[5]) OR
         (NOT in[0] AND in[2] AND in[4] AND NOT in[5]) OR
         (NOT in[2] AND NOT in[3]) AND in[4]) OR
         (in[0] AND NOT in[2] AND in[3] AND NOT in[4]) OR
         (in[0] AND in[2] AND NOT in[4]);
out[4] = (NOT in[2] AND NOT in[3] AND in[5] OR
         (in[0] AND NOT in[2] AND in[3] AND in[4]) AND NOT in[5]) OR
         (in[0] AND in[2] AND in[4]) AND NOT in[5]) OR
         (NOT in[4] AND in[5]);
out[5] = in[0];
```

The randomizer generator 125 is illustrated in FIG. 20. The randomizer generator shown in the DDS format standard comprises a 15-bit linear feedback shift register with the output bit and proceeding bit being exclusively ORed together and fed back to the input end of the shift register; the shift register is seeded with a 15-bit string all bits of which are zero except the lowest order bit. In the FIG. 20 randomizer generator, the linear feedback shift register is replaced by a 15-bit register 140 (the fifteen register cell outputs of which are labelled $x_0$ to $x_{14}$) arranged to be initialized on reset by the same sequence as the aforesaid linear feedback shift register. The register is clocked by the clock signal XFERCLK/2 with each clocking of the register being arranged to effect a parallel transfer in of a new 15-bit setting which corresponds to the previous 15-bit value held in the register 140 shifted by 32 (that is, if the previous setting had been held in a linear feedback shift register according to the DDS format standard then the new setting corresponds to the value that would have been held in the shift register after 32 shifts). The bit values resulting from a 32-bit shift are determined by logic circuitry shift-32 logic 145, the new bit values $x_{32}$ to $x_{46}$ being fed via a multiplexer 148 back to the input of the register 140 (the multiplexer 148 is also fed with the initial bit sequence, the latter only being selected at reset). The new value of the register 140 after a 32-bit shift is determined by the logic circuitry 145 in accordance with the exclusive OR equations shown within that block in FIG. 20; as can be seen, this determination solely relies upon the existing values held in the register 140.

In each state of the register 140, the FIG. 20 generator is arranged to provide four randomizer bytes RB1, RB2, RB3 and RB4 respectively corresponding to the lower 8-bits $x_0$ to $x_7$ shifted by 0, 8, 16 and 24 (where a shift refers to the change brought about by the clocking of the linear feedback shift register referenced in the DDS format standard).

Byte RB1 is produced by shift-0 logic 141 effecting the transformation shown within the bounds of that element in FIG. 20; in fact, of course it is simply necessary to take the outputs $x_0$ to $x_7$ from the register 140 and pass them straight through as byte RB1.

Byte RB2 is generated by shift-8 logic 142 in accordance with the transformation shown within that element in FIG. 20. The first seven bits $x_8$ to $x_{14}$ of byte RB2 are simply the corresponding output bits of the register 140; the last bit, bit $x_{15}$, of byte RB2 is formed by an exclusive OR operation on bits $x_0$ and $x_1$.

Byte RB3 is generated by shift-16 logic 143 in accordance with the transformation shown within that element in FIG. 20, the eight bits $x_{16}$ to $x_{23}$ being derived from bits $x_1$ to $x_9$ output from register 140.

Byte RIM is generated by shift-24 logic 144 in accordance with the transformation shown within that element in FIG. 20, the eight bits $x_{24}$ to $x_{31}$ of byte RB4 being generated from bits $x_0$ to $x_3$ and $x_9$ to $x_{14}$ output from register 140.

Bytes RB1 to RB4 are then fed to a multiplexer 146 where an appropriate one of these bytes is selected in dependence on the output of a multiplexer control unit 147, the selected byte being fed to the byte-wide exclusive OR circuit 85.

The multiplexer control circuit 147 selects the appropriate byte RB2 to RB4 on the basis of the azimuth of the track being processed and also on the position of the byte being processed in the sequence of bytes within a track. With reference to FIGS. 15, it can be seen that the first two data bytes from a G1 sub-group required for a positive azimuth track are D2 and D3, these bytes being the third and fourth in the sequence of a G1 sub-group; accordingly, to match up the output of the randomizer generator of FIG. 20 to data bytes D2, D3, it is necessary to take randomizer bytes RB3 and RB4. Thereafter, the next two data bytes D4 and D5 must be matched with randomiser bytes corresponding to thirty-two and forty shifts respectively, which, of course requires the next state of the register 140 to be entered in which the basic contents of the register are shifted by 32 from the initial contents; with the register 140 in its new state, the randomizer bytes matching up with data bytes D4 and D5 are bytes RB1 and RB2. Thereafter, for the positive azimuth track, data bytes D10 and D11 are processed and this time in order to match up the randomizer bytes, the state of the register 140 must again be advanced by a further thirty two bits and bytes RB3 and RB4 selected. From the foregoing consideration, it can be seen that the sequence of byte selection required is as follows:

Positive azimuth of track—RB3, RB4, RB1, RB2, RB3, RB4, RB1, RB2 . . .

Negative azimuth of track—RB1, RB2, RB3, RB4, RB1. RB2, RB3, RB4 . . . with the contents of the register 140 being shifted by thirty two, every two bytes. The foregoing selection sequence can be readily implemented by a 0–3 counter clocked by the transfer clock XFERCLK with the azimuth signal AZ being used to introduce a two-byte offset for positive azimuth of tracks.

Variants

Although the means for transferring data between the group processor 52 and frame processor 53 has been described above as being implemented as part of the frame processor itself (the transfer functional block 85, 86), it will be appreciated that this is merely a detail of implementation and done to facilitate coordination of the transfer means with the operation of the frame processor by closely integrating the control of the transfer means with the other functional blocks of the frame processor. It would, of course, have been possible to implement the transfer means as a distinct unit separate from either the group processor or frame processor and to provide for the exchange of appropriate coordinating signals with both processors. Incorporation of the transfer means into the group processor would also be possible but generally of less benefit than incorporation into the frame processor, simply because the frame processor timing is more important as it is tied to the rotation of the head drum. Conceptually, of course, the transfer function effected by the transfer means is distinct from both the high-level data organisation effected by the group processor and the low-level track formatting effected by the frame processor.

I claim:

1. Data storage apparatus for storing and retrieving data on tape using a helical scanning write/read technique with data being stored in tracks of predetermined format written across the tape, said apparatus comprising:

a tape deck with a rotary head drum mounting heads for writing/reading data to/from the tape in tracks, data organising means operative during data storage, to receive data to be stored and to organise it, at least notionally, on the basis of frame units each corresponding to a quantity of data which can be accommodated in two of said tracks and during data retrieval, to disassemble the data out of frame units for output from said apparatus, said data organising means including a buffer memory for holding said frame units, formatting means operative during data storage, to receive data transferred in from said buffer memory and to process it into said track format prior to being written in tracks to tape by said heads, constituent data elements from each frame unit being interleaved with each other across two tracks, and during data retrieval to receive data read from tape by said heads and to process it out of said track format ready for transfer out to said buffer memory, the data in said buffer memory being held therein in non-interleaved form, transfer means for transferring data from said buffer memory to said formatting means during data storage and from said formatting means to said buffer memory during data retrieval, and a system controller for controlling and coordinating the operation of said apparatus;

the transfer means including means for selecting transfer all constituent data elements relevant to one track as recorded on tape and then selecting for transfer all constituent data elements relevant to a next track whereby data is transferred between said buffer memory and said formatting means on a track by track basis with the transfer of data in respect of one said track being completed before the transfer of data in respect of the next said track is commenced.

2. Data storage apparatus according to claim 1, wherein said formatting means includes track memory means for storing data being processed into/out of said track format by the formatting means, said transfer means being operative during data storage to access non-interleaved data held in the buffer memory of the data organising means and to transfer that data to said track memory means for storage therein in interleaved form, and during data retrieval, to access data held in said track memory means in interleaved form and transfer it to said buffer memory for storage therein in non-interleaved form.

3. Data storage apparatus according to claim 2, wherein said transfer means includes first and second address generators for generating addresses respectively for accessing said buffer memory and said track memory means during the transfer of data relevant to one said track, the first and second address generators being operative such that the constituent data elements relevant to said one track are transferred sequentially by the transfer means in the order of their occurrence in the corresponding frame unit when considered in non-interleaved form.

4. Data storage apparatus according to claim 1, wherein said constituent data elements are eight-bit bytes which are transferred by said transfer means in bit-parallel, byte serial manner between the data organising means and formatting means.

5. Data storage apparatus according to claim 1, wherein said constituent data elements are interleaved in accordance with the DDS format as specified in ISO/IEC Standard 10777:1991.

6. Data storage apparatus according to claim 3, wherein said constituent data elements are interleaved in accordance with the DDS format as specified in 1SO/IEC Standard 10777:1991, and wherein said first address generator comprises a binary counter with a plurality of counter outputs of increasing binary weightings, and reconfiguration means for reconfiguring said counter outputs into generator outputs providing in binary form said addresses generated by the first generator means, said reconfiguration means being operative to:

pass through the counter output of $2^0$ weighting onto the correspondingly weighted generator output, reconfigure the counter output of $2^1$ weighting onto the $2^1$ and $2^2$ weighted generator outputs, the $2^1$ weighted generator output being inverted or non- inverted in dependence on which track of each pair of tracks associated with a said frame unit, is being transferred by said transfer means, and reconfigure all other counter outputs onto generator outputs of one greater weighting.

7. Data storage apparatus according to claim 1, wherein during data storage, said constituent data elements are subject to a randomisation process by combination with respective randomising elements, said randomising elements together forming a predetermined sequence which is progressive in correspondence with the ordering of said constituent data elements across an uninterleaved frame unit, said randomisation being reversed during data retrieval by a complementary de-randomisation process; said transfer means including randomiser means operative to effect said randomisation/derandomisation process during the transfer of data relevant to one said track, said randomiser means in providing appropriate said randomising elements from said predetermined sequence, taking account of the distribution of the constituent data elements of said one track across the corresponding frame unit.

8. Data storage apparatus according to claim 7, wherein said randomiser means is operative to effect byte-wide randomisation/de-randomisation of data and comprises:
a sub-sequence register for holding a sub-sequence of said pre-determined sequence and having a plurality of outputs the states of which are determined by said subsequence and serve to define at least one randomisation/derandomisation byte,
first combinational logic connected to receive both a byte of data being transferred by said transfer means and a said randomisation/de-randomisation byte, and to combine said bytes to derive a randomised/de-randomised data byte, and
second combinational logic responsive to the states of said register outputs to generate a new said sub-sequence for loading into said register, said new sub-sequence corresponding to the previous subsequence shifted by an amount corresponding to said at least one byte.

9. Data storage apparatus according to claim 8, wherein said randomiser means further comprises:
byte output means responsive to the states of said register outputs to provide a plurality of said randomisation/de-randomisation bytes sequentially arranged in said predetermined sequence, said byte output means including combinational logic for predicting bits of said randomisation/de-randomisation bytes not represented by said register outputs; and
byte selection means for selecting from said plurality of randomisation/de-randomisation bytes , said randomisation/de-randomisation byte to be combined by said first combinational logic with said byte of data, said byte selection means effecting its selection in dependence at least on which track of each pair of tracks associated with a said frame unit, is being transferred by said transfer means.

10. Data storage apparatus according to claim 9, wherein said byte output means is arranged to provide four randomisation/de-randomisation bytes, said new sub-sequence generated by said second combinational logic corresponding to said previous sub-sequence shifted by thirty-two bits within said predetermined sequence.

11. Data storage apparatus according to any one of claims 8, 9 or 10, wherein said predetermined sequence is in accordance with the DDS format as specified in ISO/IEC Standard 10777:1991, said sub-sequence being fifteen bits long.

12. A method of storing and retrieving data on tape using a helical scanning write-read technique with data being stored in tracks of predetermined format written across the tape, said method comprising the steps of:
writing/reading data to/from the tape in tracks,
during data storage, receiving data to be stored and organising it, at least notionally, on the basis of frame units each corresponding to a quantity of data which can be accommodated in two of said tracks, and during data retrieval, disassembling the data out of frame units for output, said frame units being held in a buffer memory,
during data storage, receiving data transferred in from said buffer memory and processing it into said track format prior to writing said data in tracks to tape, constituent data elements from each frame unit being interleaved with each other across two tracks, and during data retrieval, receiving data read from tape and processing it out of said track format ready for transfer out to said buffer memory, the data in said buffer memory being held therein in non-interleaved form,
transferring data from said buffer memory during data storage, and to said buffer memory during data retrieval, on a track by track basis with the transfer of data in respect of one said track being completed before the transfer of data in respect of the next said track is commenced.

13. The method according to claim 12, wherein data being processed into/out of said track format is stored in track memory means, including the step, during data storage, of accessing non-interleaved data held in the buffer memory and transferring that data to said track memory means for storage therein in interleaved form, and during data retrieval, of accessing data held in said track memory means in interleaved form and transferring it to said buffer memory for storage therein in non-interleaved from.

14. The method according to claim 13, including the step of generating addresses respectively for accessing said buffer memory and said track memory means during the transfer of data relevant to one said track, the constituent data elements relevant to said one track being transferred sequentially in the order of their occurrence in the corresponding frame unit when considered in non-interleaved form.

15. The method according to claim 12, wherein said constituent data elements are eight-bit bytes which are transferred in bit-parallel, byte serial manner.

16. The method according to claim 14, wherein said constituent data elements are interleaved in according with the DDS format as specified in ISO/IEC Standard 10777:1991, and wherein addresses for accessing said buffer memory are generated by a binary counter with a plurality of counter outputs of increasing binary weightings, and said counter outputs are reconfigured into said addresses in binary digit form, said reconfiguring comprising:
passing the counter output of $2^0$ weighting through as the correspondingly weighted address binary digit,
reconfiguring the counter output of $2^1$ weighting as the $2^1$ and $2^2$ weighted address binary digits, the $2^1$ weighted address binary digit being inverted or non-inverted in dependence on which track of each pair of tracks associated with a said frame unit is being transferred, and reconfiguring all other counter outputs as address binary digits of one greater weighting.

17. The method according to claim 12, wherein during data storage, said constituent data elements are subject to a randomisation process by combination with respective randomising elements, said randomising elements together forming a predetermined sequence which is progressive in correspondence with the ordering of said constituent data elements across an uninterleaved frame unit, said randomisation being reversed during data retrieval by a complementary de-randomisation process; said randomisation/de-randomisation process being effected during the transfer of data relevant to one said track and taking account, in providing appropriate said randomising elements from said predetermined sequence, of the distribution of the constituent data elements of said one track across the corresponding frame unit.

18. The method according to claim 17, wherein randomisation/de-randomisation of data is effected in a byte-wide manner and comprises:

storing a sub-sequence of said predetermined sequence, said sub-sequence defining at least one randomisation/derandomisation byte, combining a byte of data being transferred and a said randomisation/de-randomisation byte to derive a randomised/de-randomised data byte, and generating a new said sub-sequence corresponding to the previous subsequence shifted by an amount corresponding to said at least one byte.

19. The method according to claim 18, wherein said randomisation/de-randomisation further comprises:

providing a plurality of said randomisation/derandomisation bytes sequentially arranged in said predetermined sequence; and selecting from said plurality of randomisation/derandomisation bytes said randomisation/de-randomisation byte to be combined with said byte of data, selection being effected in dependence at least on which track of each pair of tracks associated with a said frame unit, is being transferred.

20. The method according to claim 19, wherein four randomisation/de-randomisation bytes are provided, said new subsequence corresponding to said previous sub-sequence shifted by thirty-two bits within said predetermined sequence.

* * * * *

UNITED STATES PATENT AND TRADEMARK OFFICE
CERTIFICATE OF CORRECTION

| | | |
|---|---|---|
| PATENT NO. | : 5,367,410 | Page 1 of 1 |
| APPLICATION NO. | : 08/024527 | |
| DATED | : November 22, 1994 | |
| INVENTOR(S) | : Dominic McCarthy | |

It is certified that error appears in the above-identified patent and that said Letters Patent is hereby corrected as shown below:

IN THE CLAIMS

Claim 1, Column 24, line 8, before "transfer all" insert --for--

Signed and Sealed this

Fourteenth Day of October, 2008

JON W. DUDAS
*Director of the United States Patent and Trademark Office*